Jan. 2, 1945.　　　　R. C. DEHMEL　　　　2,366,603
AIRCRAFT TRAINING APPARATUS
Filed Dec. 20, 1941　　16 Sheets-Sheet 2

INVENTOR
Richard Carl Dehmel

Jan. 2, 1945.  R. C. DEHMEL  2,366,603
AIRCRAFT TRAINING APPARATUS
Filed Dec. 20, 1941  16 Sheets-Sheet 3

INVENTOR.
Richard Carl Dehmel

Jan. 2, 1945.　　　R. C. DEHMEL　　　2,366,603
AIRCRAFT TRAINING APPARATUS
Filed Dec. 20, 1941　　　16 Sheets-Sheet 4

INVENTOR
Richard Carl Dehmel

Jan. 2, 1945.   R. C. DEHMEL   2,366,603
AIRCRAFT TRAINING APPARATUS
Filed Dec. 20, 1941   16 Sheets-Sheet 5

INVENTOR.
Richard Carl Dehmel.

Jan. 2, 1945. R. C. DEHMEL 2,366,603
AIRCRAFT TRAINING APPARATUS
Filed Dec. 20, 1941 16 Sheets-Sheet 7

INVENTOR
Richard Carl Dehmel

Jan. 2, 1945.  R. C. DEHMEL  2,366,603
AIRCRAFT TRAINING APPARATUS
Filed Dec. 20, 1941   16 Sheets-Sheet 8
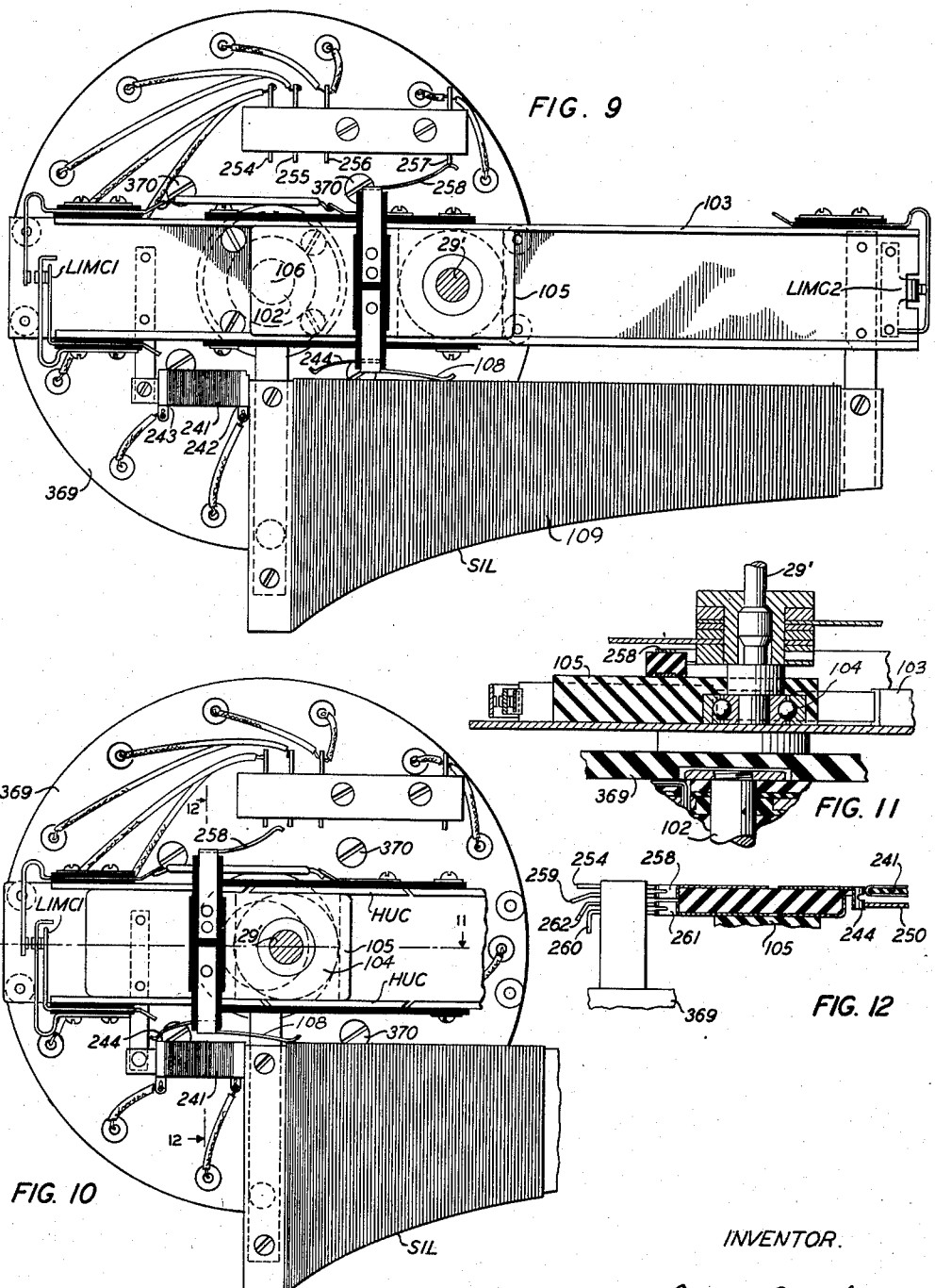
INVENTOR.
Richard Carl Dehmel.

Jan. 2, 1945.   R. C. DEHMEL   2,366,603
AIRCRAFT TRAINING APPARATUS
Filed Dec. 20, 1941    16 Sheets-Sheet 9

INVENTOR
Richard Carl Dehmel

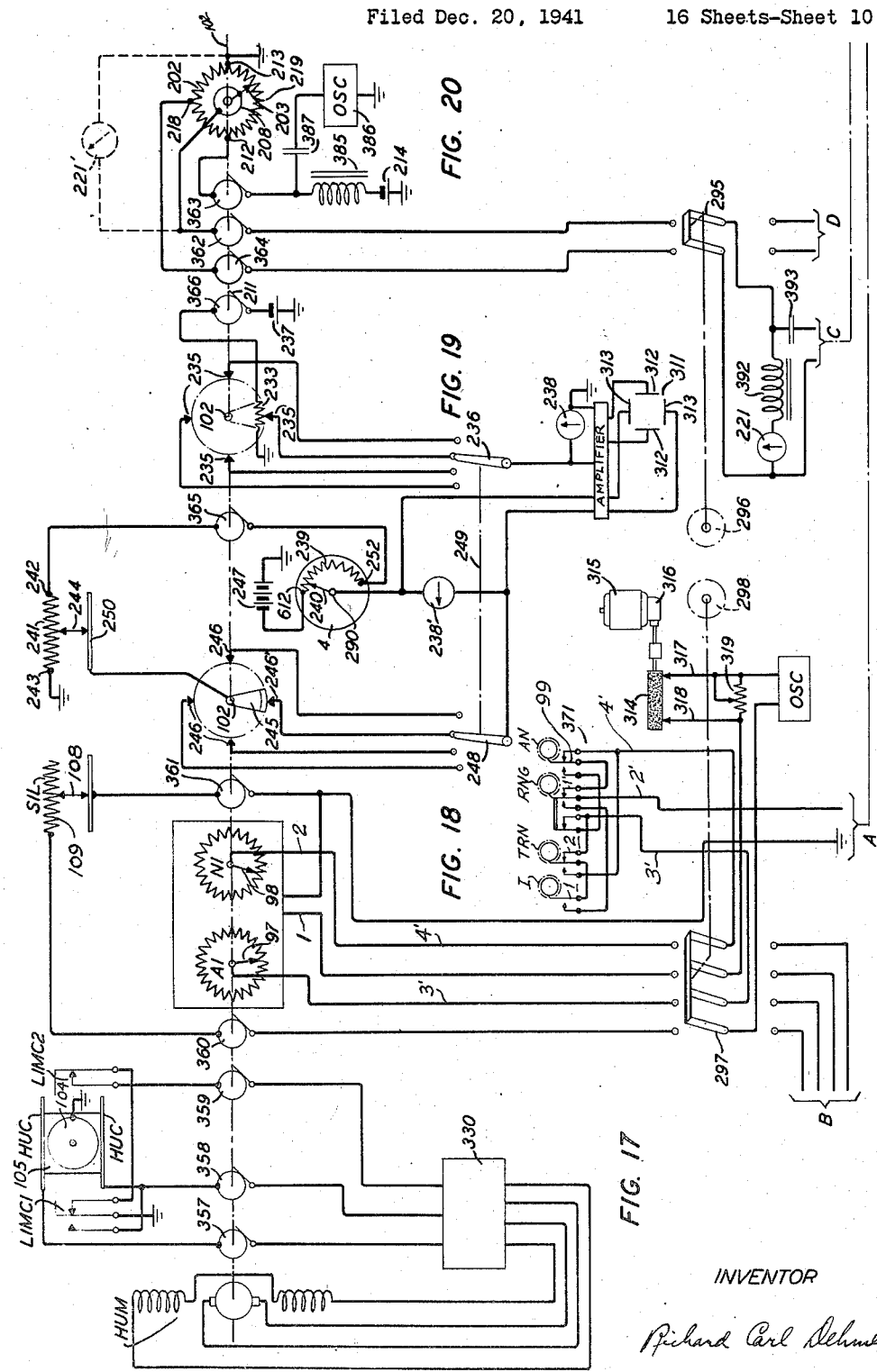

INVENTOR
Richard Carl Dehmel

Jan. 2, 1945.   R. C. DEHMEL   2,366,603
AIRCRAFT TRAINING APPARATUS
Filed Dec. 20, 1941   16 Sheets-Sheet 12

INVENTOR
Richard Carl Dehmel

INVENTOR
Richard Carl Dehmel

Jan. 2, 1945. R. C. DEHMEL 2,366,603
AIRCRAFT TRAINING APPARATUS
Filed Dec. 20, 1941 16 Sheets-Sheet 15

INVENTOR
Richard Carl Dehmel

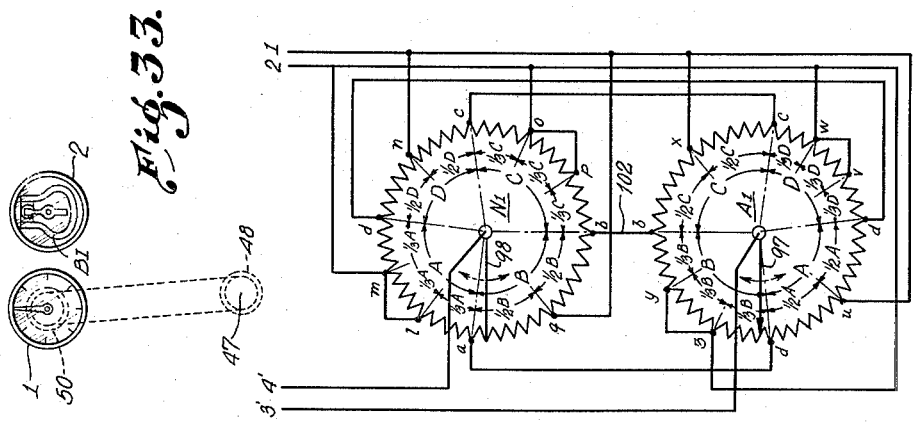
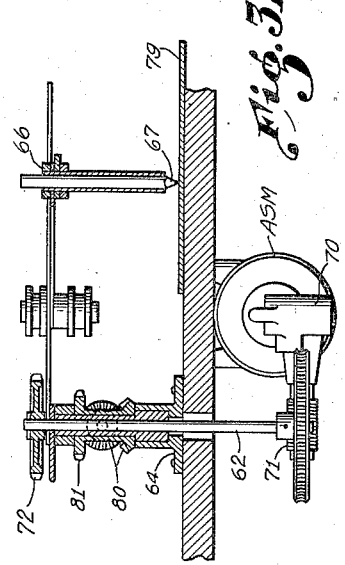
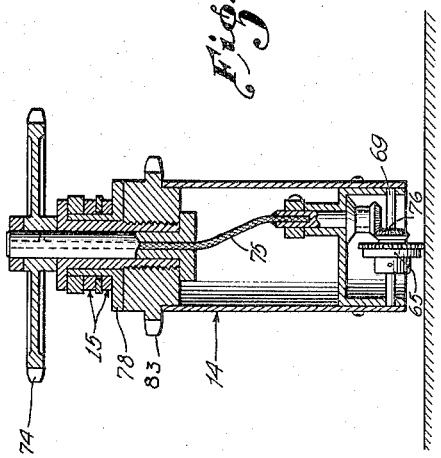

Patented Jan. 2, 1945

2,366,603

UNITED STATES PATENT OFFICE 2,366,603

AIRCRAFT TRAINING APPARATUS

Richard Carl Dehmel, Summit, N. J.

Application December 20, 1941, Serial No. 423,824

109 Claims. (Cl. 35—12)

My invention relates to an aircraft trainer for teaching student pilots to fly aircraft blindly by instruments and to practice orientation with respect to radio signals.

In one known type of trainer for this purpose standard aircraft instruments are operated pneumatically and the radio signals are varied manually by the instructor to simulate the changes in the signals received by a pilot actually flying the course being simulated by the student.

In my copending application Serial No. 398,590, filed June 18, 1941, I have disclosed a trainer in which standard aircraft instruments are replaced by much less expensive devices such as tachometers with aircraft instrument dials, these devices being operated electrically in accordance with the movements of the flight controls. A further important feature of my prior application is means for varying the radio signals automatically in the proper manner as the student flies a course.

The present invention is a continuation-in-part of my said prior co-pending application and is an improvement as to certain features thereof. Certain features disclosed herein are common to this and said prior application and such features as are disclosed but not claimed herein will be claimed in my said prior application.

In general, the apparatus of my invention comprises flight equipment, a charting device, and radio orientation equipment. The flight equipment comprises electro-mechanical facilities controlled by an aileron, rudder, elevator, throttle and stabilizer to give the same instrument readings as would be obtained with an actual aircraft in flight. The instruments duplicate the indications of a conventional ball bank indicator, rate of turn meter, rate of climb indicator, altimeter, artificial horizon, air speed meter, a true direction (gyro) compass, a magnetic direction compass and radio compass and direction apparatus.

A charting device is provided for tracing the path of the simulated flight over the range.

The orientation equipment comprises one or more automatic signal controlling devices operated either manually by the instructor and/or by the electro-mechanical circuit referred to above. This signal controller transmits signals to the pilot that duplicate those received in an actual aircraft during its flight in any desired radio range or ranges. The signals may include a fan marker, Z marker, glide and localizer path markers and indicators and/or landing marker beacon, radio compass signals, and station identification as well as the A and N signals. The automatic signal controlling device is so arranged that wind drift may be introduced, and, in addition, the beams of the range may be shifted to reproduce double beams, dog-legs or other irregularities.

The apparatus of the trainer may be regarded as consisting of two assemblies each usable independently or in combination with the other. One of the assemblies consists of aircraft controls and associated circuits necessary to reproduce, on a group of instruments, the same readings as would occur on the flight instruments of an actual aircraft subjected to like control manipulation. This is the instrument flight training assembly. The other assembly comprises facilities for practicing in the determination of the position of an aircraft flying in a radio range. This is the orientator assembly.

For further details of the invention, reference may be made to the drawings wherein Fig. 1 is a plan view of simulated aircraft controls and a traversing table with signal and charting equipment according to the present invention.

The object of this invention is to improve the airplane control and rough air circuits of the trainer of my prior application, to simulate certain of the latest radio aids to aerial navigation, to include additional blind flying and navigation instruments and, in general, to make available, for flight training, facilities which duplicate substantially all the conditions of actual flight on modern airways in an entirely automatic manner so that the value of the trainer as an aid to the student is independent of the skill of the instructor in manipulating the various signal controls.

A particularly useful and important feature of my invention is a mixing circuit which combines voltages produced by movement of the aircraft trainer controls in such a manner that the output of this circuit when applied through suitable devices such as grid controlled rectifier tubes will cause motors to operate flight instruments and a signal controller. The flight instruments and signal controller give to the pilot the same visual and audible representations as he would receive from the instruments and radio facilities of an actual airplane in flight.

The sensitivity of the response of the trainer to its control is made variable to simulate different types and sizes of airplanes by providing a variable attenuator in the connections between the mixing circuit and the motors used for operating the flight instruments and in the case of a movable trainer, for producing the motion of the trainer.

Another feature of the invention is an improved means for simulating in a very simple and inexpensive manner the delay in the response of an actual airplane to the movement of its controls.

As a further approximation to the conditions of actual flight, the cabin of the trainer is provided with means for simulating the sounds of an airplane in flight, these sounds being varied in pitch and intensity as the flight controls are operated.

A very useful and important feature of the invention is a novel means for simulating radio range signals, blind landing glide beams and radio marker signals and causing these to vary entirely automatically as the pilot operates the trainer, the variations producing a replica of the radio signals that the pilot would receive were he in actual flight over an airway radio range.

According to a further feature of the invention interlaced and overlapping radio patterns simulating those received from two or more transmitting stations may be set up by means of a plurality of signal controllers all operated automatically according to the course being "flown" by the student.

Another important feature of my invention comprises means for simulating a radio compass, a radio direction finder and a continuous radio direction indicator with the point of balance of each being changed by movement of the trainer elements.

These and many other features of the invention, such as a novel means of introducing the effects of wind drift, will be more clearly understood from the following detailed description of the construction and operation of my trainer and the accompanying drawings in which:

Fig. 9 is a plan view of the controller, showing the operating arm and contacts in one position.

Fig. 10 is a partial view of Fig. 9 showing the contacts in another position.

Fig. 11 is a sectional view on line 11—11 of Fig. 10.

Fig. 12 is a sectional view on line 12—12 of Fig. 10.

Fig. 17 is a circuit for the limit control of the arm shown on Fig. 9.

Figs. 18, 19, 20, 21 and 22 are the control and signal circuits of controller, Fig. 8.

Figure 31 is a sectional view of the pantograph recording pencil support on line 31—31 of Figure 1.

Figure 32 is a sectional view of the charting head on line 32—32 of Figure 1.

Figure 33 is a somewhat diagrammatic front elevational view showing further details of certain instruments shown on the panel 7 of Figure 3.

Figure 34 is a wiring diagram of certain features shown in Figure 8.

Figure 1:
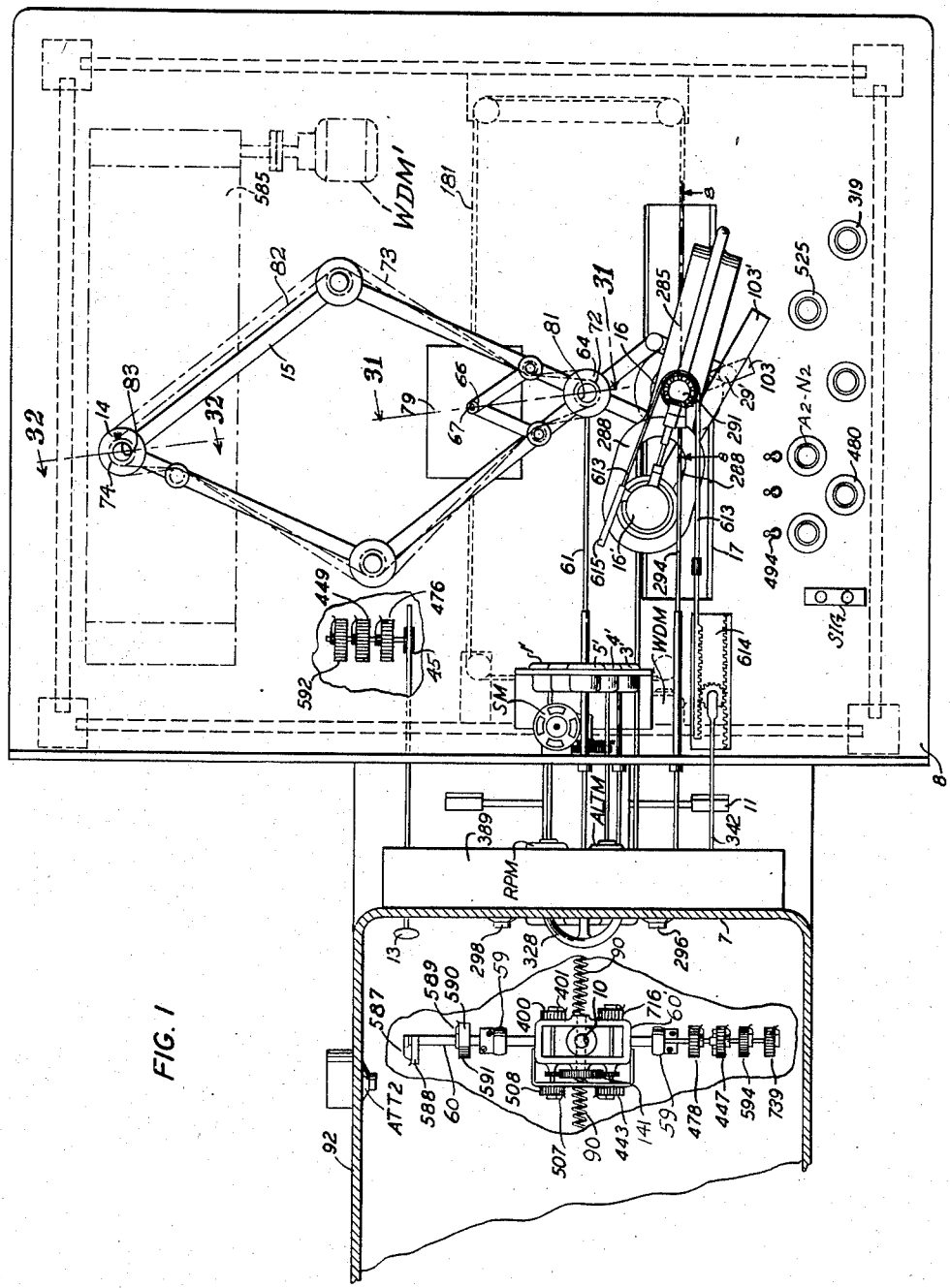
Fig. 1 is a plan view of the aircraft simulating apparatus, its controls and a traversing table with signal control and charting equipment.
Figure 2:
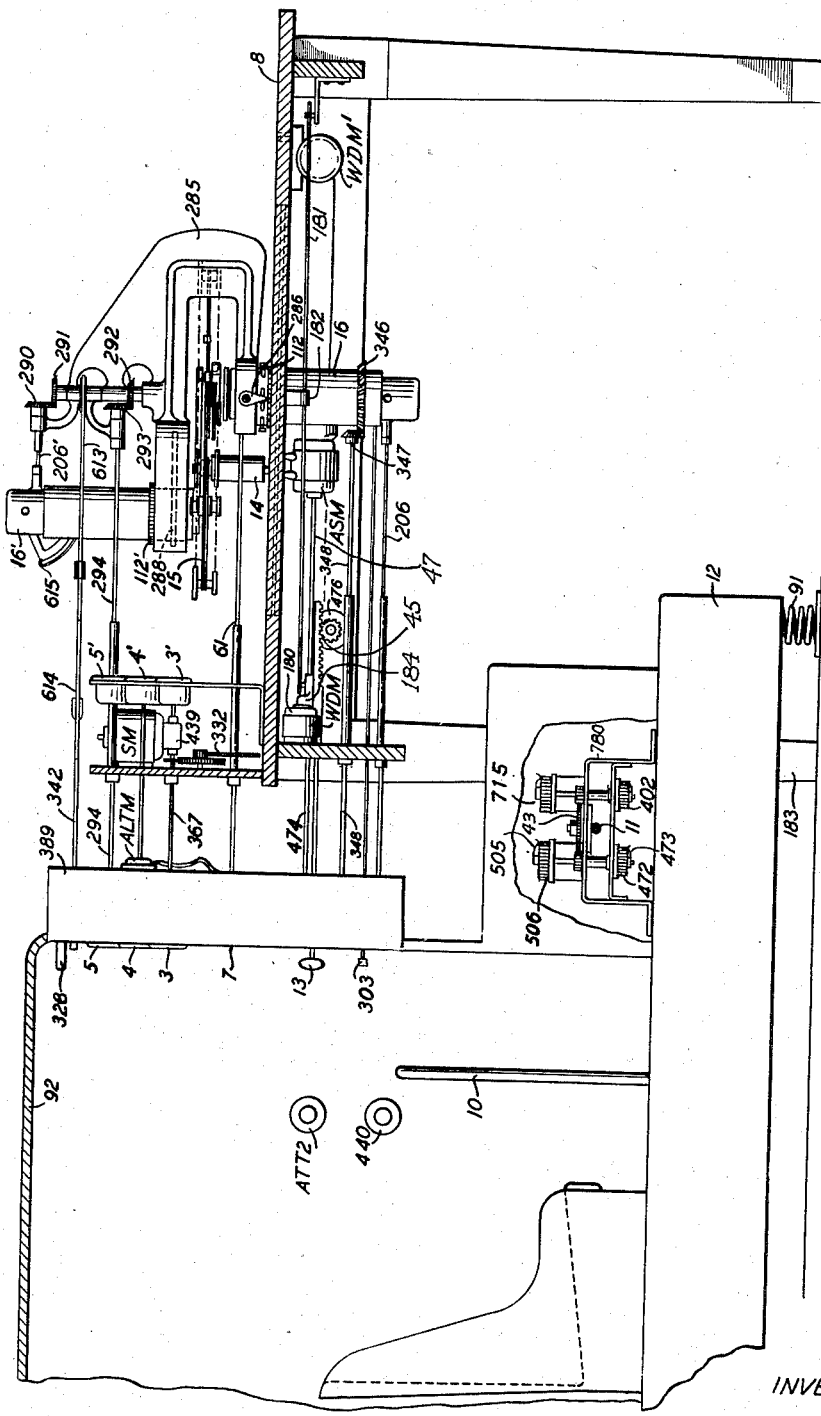
Fig. 2 is an elevation of the apparatus of Fig. 1 partly in section.
Figure 3:
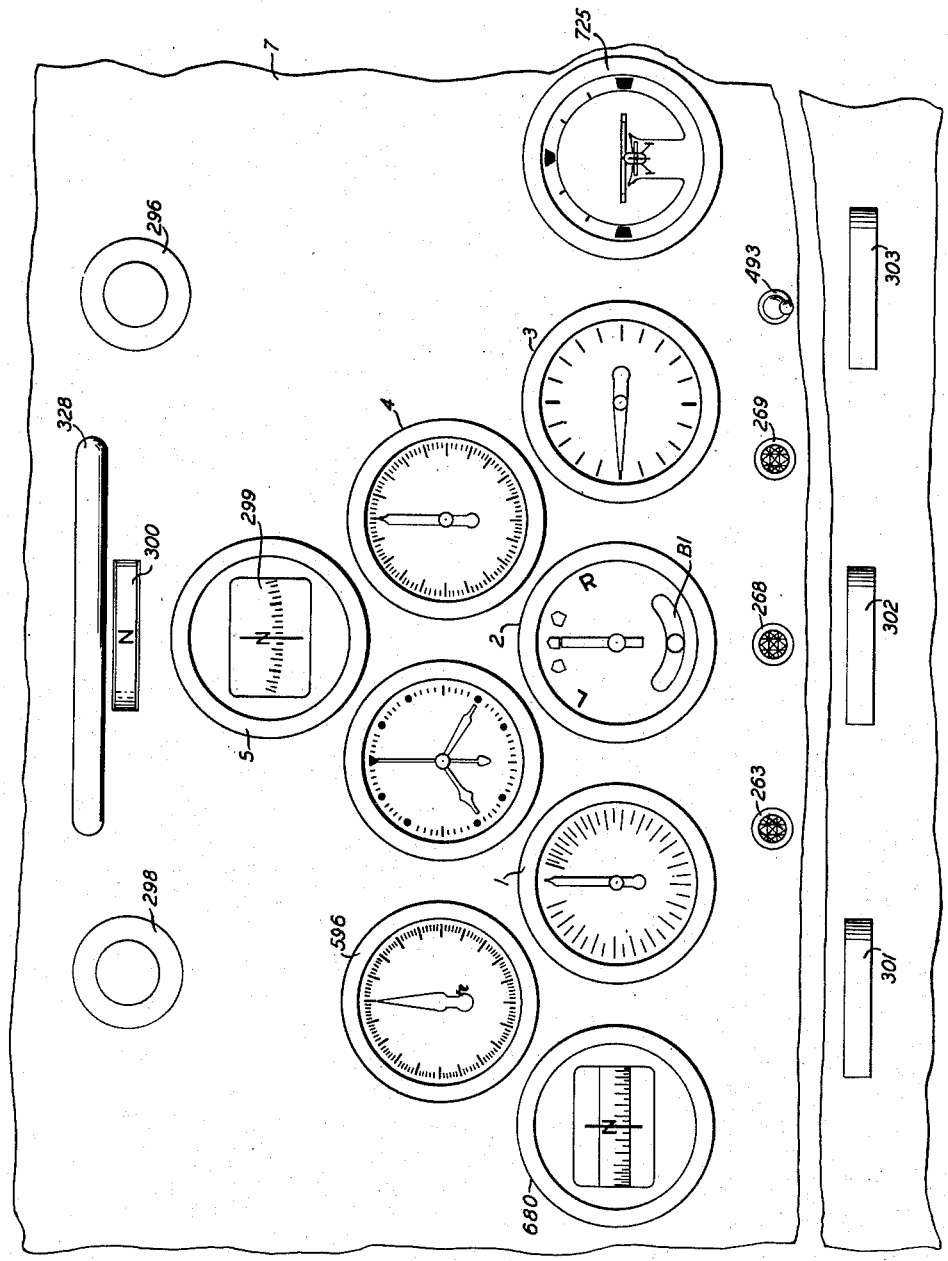
Fig. 3 is a front elevation of the instrument panel of Fig. 1 and Fig. 2.
Figure 5:
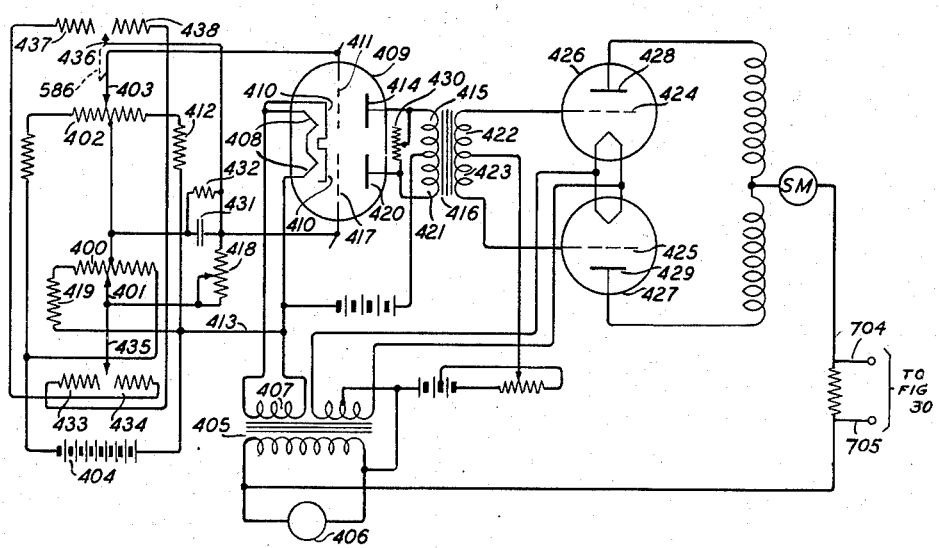
Fig. 5 is the circuit for steering control.
Figure 6:
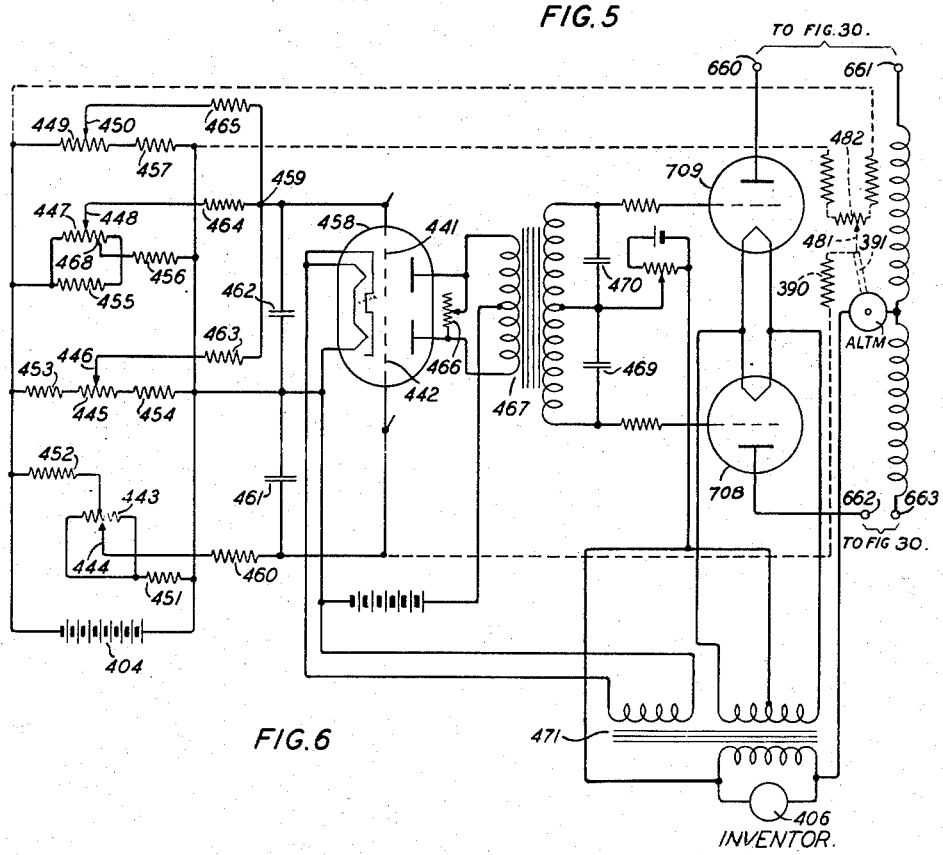
Fig. 6 is the circuit for altitude control.
Figure 7:
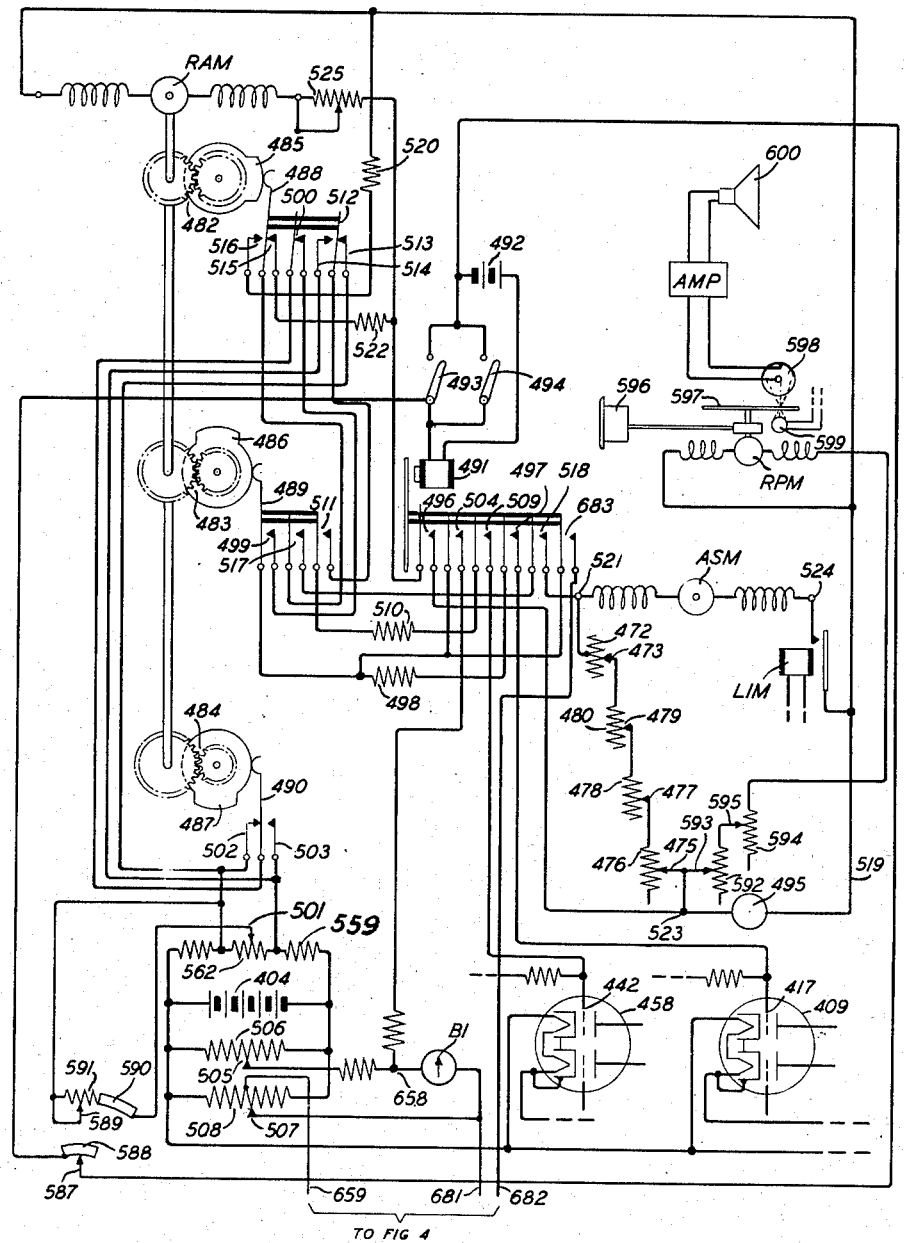
Fig. 7 is the circuit for rough air control.

Referring to the drawings, and more particularly to Figures 1 and 2, the trainer comprises aircraft controls 10, 11, 13 and 440, Fig. 2, circuits Figs. 5, 6 and 7 operated thereby; and flight indicators consisting of a flight instrument group, Fig. 3, a course charting device 14, Fig. 1, and signal controllers 16 and 16' each of which is responsive to the circuits. The output elements of the control circuits to which the flight instruments, the course charting head and signal controller respond comprise three motors, namely, the air speed motor ASM, the steering motor SM and the altimeter motor ALTM. These matters will be more fully referred to and their function and the element responsive thereto will be more fully detailed below. For the sake of brevity, the instrument flight training assembly and the orientator assembly will be described in combination, it being clear that either may be used alone. The two assemblies are mechanically linked together for combination use by the ASM motor shaft 62, Figs. 2 and 31 and the SM steering motor shaft 61, Figs. 1 and 2.

The course charting head 14, Figs. 1, 2 and 32, is steerably mounted in the pantograph 15 at the sleeve 78, Fig. 32. The position of the head 14 represents the location of the aircraft on the range, the orientation of the head is the true course and the velocity of the head is proportional to the air speed. Mounted in the joint 66, Fig. 1 is a path tracing pencil 67 which plots the course in reduced scale on map 79, Fig. 1.

The tractive wheel 65, Fig. 32, is rotated on its own axis 69 by the air speed motor ASM, Fig. 2 which is responsive to controls 10, 11, 13 and 60 through the circuits of Fig. 7. The motor ASM is secured to the underside of the traversing table 8. The ASM motor drives the wheel 65 through the reduction gearing 70 and 71, Fig. 31, the shaft 62, sprocket 72, the chain 73, Fig. 1 the driven sprocket 74, Figs. 1 and 32, and the flexible shaft 75 which transmits power through the miter gears 76 to the tractive wheel 65 which moves the head 14.

The motor ASM also drives the air speed indicator 1 Fig. 3 through the shaft 47 and pulleys 48 and 50, Figs. 2 and 33. The air speed indicator 1 is a tachometer of any standard design but calibrated in terms of air speed units. The tachometer construction may be the revolving magnet type commonly used for automobile speedometers. However, a vibration tachometer, or an electrical tachometer could be used as alternatives.

To simulate turning of the aircraft, the steerable course charting head 14 Figs. 1 and 32 is rotated by the steering motor SM, Figs. 1, 2 and 23, said motor being responsive to controls 10, 11 and 13 through circuits, Figs. 5 and 7 in the manner to be more particularly described hereinafter. Mechanical connection between the motor SM and head 14 is through the gear train 438 and 332, Figs. 2 and 23, and the shaft 61 and the miter gears 80, Fig. 31, the driving sprocket 81, the chain 82, Figs. 1 and 31, and the driven sprocket 83, Figs. 1 and 32. Directly connected to the motor SM is the rate of turn indicator 2, Figs. 3 and 23. This indicator, like the air speed indicator 1, is a tachometer of any conventional design. It is, however, of zero center construction and is calibrated to show the turning rate in "needle-widths." Contained in the same housing as the rate of turn indicated is the "ball bank" indicator which comprises a galvanometer BI, Figs. 3 and 33, responsive to controls 10, 11 and 13 through the circuits of Fig. 7.

Figure 23:
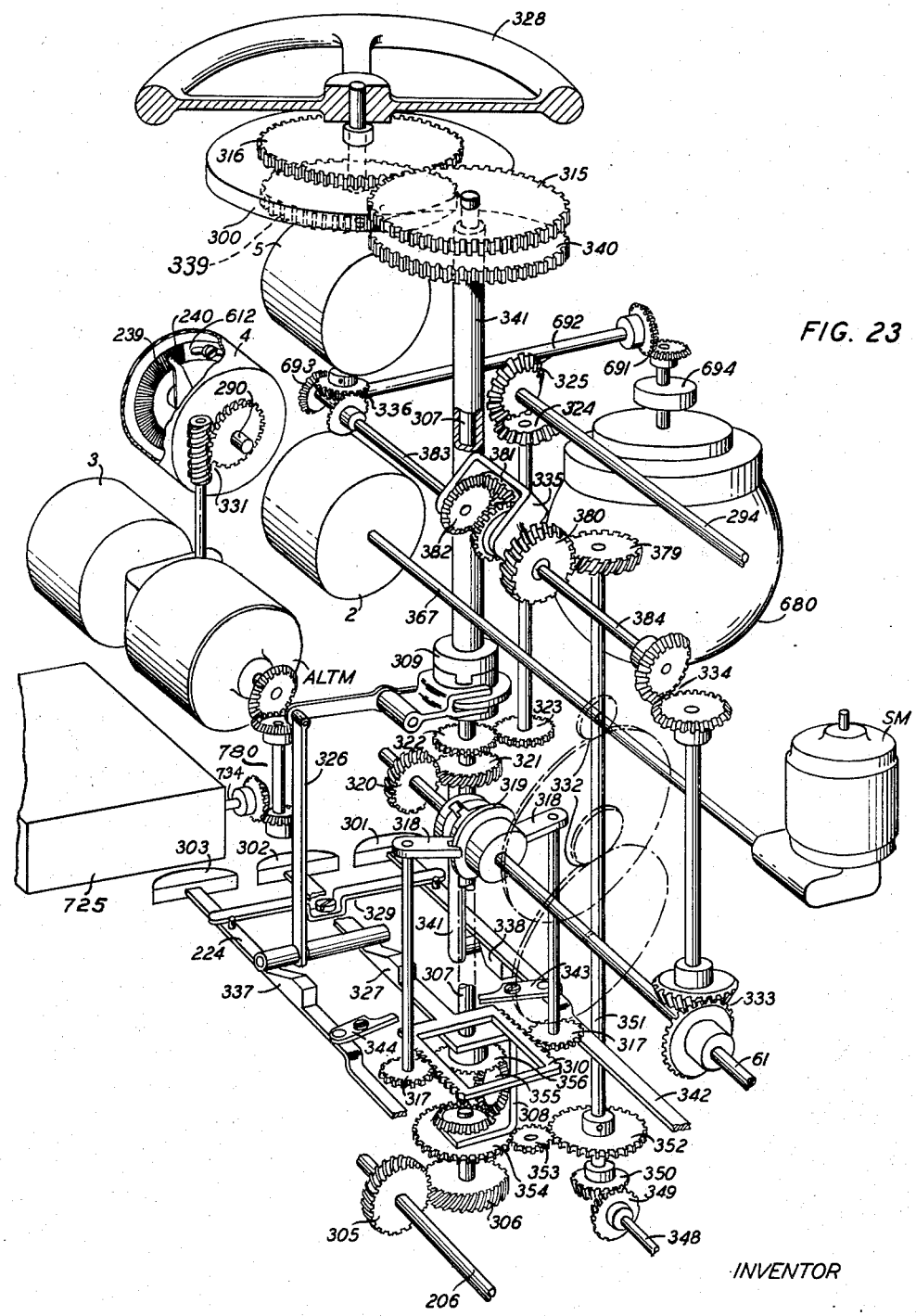
Fig. 23 is a perspective view of the mechanical controls behind the instrument panel Fig. 3.

Driven by the shaft 61, Figs. 1, 2 and 23 is a compass and dial 5, Figs. 2 and 23. This operation is described in fuller detail hereinafter. Inasmuch as the ratio of the miter gears 80 and the sprockets 81 and 83 Figs. 31 and 1, and the gears 320, 321 Fig. 23 and other gears of the train total unity, the compass 5 indicates the heading of the course charting head 14.

The course charting device referred to above and in the claims may serve as an indicating instrument or it may be used for recording the flight by inking its tracing wheel.

The ASM motor drives the course charting head 14 and the air speed meter 1, Fig. 3, at a rate proportional to the forward speed of the airplane. The steering motor SM orients the course charting head 14, operates the rate of turn indicator 2, Fig. 3, and the compass 5, Fig. 3. The altimeter motor ALTM drives the rate of climb indicator 3 and the altimeter 4 at a rate corresponding to the vertical air speed of the airplane.

The rate of climb meter 3 Figs. 2, 3 and 23, is operated by direct connection to the altitude motor ALTM, Figs. 1, 2 and 23, which is responsive to controls 10, 11 and 13 through the circuits of Figs. 6 and 7. The meter 3 is a tachometer having two-way deflection from zero and calibrated to represent rate of climb. Also driven by the motor ALTM, through gearing 331 and 290, Fig. 23 is the altimeter 4, the indicating element of which is a simple pointer.

Means other than tachometers could be employed for indicating airspeed, rate of turn and rate of climb. For example, it is obvious that galvanometers having suitable scale calibration markings and connection as for instance across the motors ASM, SM or ALTM would serve satisfactorily as airspeed, rate of turn and rate of climb meters. I could also use other means actuated by an intermediate circuit such as Figs. 5, 6 and 7 which are responsive to controls 10, 11 and 13.

Other instruments of my apparatus, as shown in Figs. 1, 3, 23 and 24, are attenuator ATT2 for adjusting the strength of the radio range signals, a meter RPM Figs. 1 and 7 depicting an engine tachometer duplicate rough air switches 493 and 494 for actuating a feature of the circuit which causes all instruments to have agitated deflections such as occur with aircraft flying in rough weather. An average air speed control 480, Figs. 1 and 7 is provided to adjust the average speed of the airspeed motor ASM to any desired "cruising" value thereby enabling the student to solve problems at a faster rate as he acquires proficiency.

The entire pilot's compartment or operating station including the hood 92, the instrument casing 389 and the compartment frame 12 is mounted on springs 91 and is displaceable with respect to table 8. Accordingly, flexible shafts such as 294, 348 and 367 are employed as connecting drives. Duplicate indicators showing the flight variants or quantities, namely, rate of climb, altitude and compass bearing are provided respectively at 3', 4' and 5', Fig. 2, by extending shafts from the instruments in case 389 to the rear. The air-speed indicator and rate of turn meter are duplicated in the same manner. Referring to Fig. 1, shaft 60 which is operated by the stick control 10 in the elevator direction is mounted in bearing supports 59 to operate contactor 588 and potentiometers 590, 478, 447, 594 and 739.

Stick control 10 is also pivotally mounted for simulation of aileron movement in gimbal frame 60, and operates potentiometers 508, 400, 716 and 443 through gearing 141.

Springs 90 restore shaft 60 and control 10 to its normal vertical position.

Throttle control 13 operates the rack and pinion 45, Figs. 1 and 2, to adjust potentiometers 592, 449 and 476.

The rudder bar 11, Figs. 1 and 2, is pivotally mounted on frame 180 to drive potentiometers 506, 715, 472 and 402 through gearing 43, Fig. 2.

Stabilizer control 440, Fig. 2, is the operating knob of potentiometer slider 446 of potentiometer 445, Fig. 6.

*Multiple-input control amplifier*

I have found that an exceptionally advantageous control circuit may be provided by a novel combination comprising essentially potentiometers and thermionic valves. In this specification and the following claims the terms "vacuum tubes" and "electron tube" both refer broadly to actual high vacuum devices functioning by electron emission and control and/or gaseous discharge tubes, such as thyratrons, functioning by ionic conduction and electron control; and the term "thermionic valve," or the like expression is intended as a generic expression to comprehend the said devices and those of a similar character whether using a hot cathode or cold emitter. These terms also include the associated circuits necessary for the operation of the tubes. Referring to Fig. 5, the potentiometer 400 has a slider 401 which is operated by deflection of the aileron control 10, Fig. 1, and the potentiometer 402 has a slider 403 which is operated by deflection of the rudder control 11, Figs. 1 and 2. These potentiometers are energized by direct current from the power source 404. The transformer 405 operates from the alternating current source 406 and has a secondary winding 407 which heats the filaments 408 of vacuum tube 409 and thereby the cathodes 410. Negative bias voltage at the grid 411 is obtained from slider 403 of potentiometer 402; the return connection to cathode 410 is completed through the balancing resistor 412, wire 413 and the transformer winding 407. The connection of heater winding 407 in series with the grid return lead 413 and the cathode 410 is a convenient means of modulating the grid bias voltage to superimpose an alternating current on the steady current to plate 414.

The plate current with its superimposed alternating current flows through section 415 of the push-pull primary winding of transformer 416 at an amplitude dependent on the position of slider 403 which in turn depends on the position of the rudder 11, Fig. 1. Negative bias voltage for the grid 417 is obtained from slider 401 of potentiometer 400 through resistance 418 and the grid return connection to the cathode 410 extends through the balancing resistance 419, wire 413 and transformer winding 407. The current to plate 420 is therefore modulated by the alternating voltage of winding 407 in a manner similar to that employed for modulating the current of plate 414 and this modulated current passes through section 421 of transformer 416. It will be clear that if the voltages at sliders 401 and 403 are equal, which is the condition when the rudder and aileron are centrally disposed, the superimposed alternating currents from plates 414 and 420 will be equal in magnitude but opposite in phase and will therefore induce no voltage in the secondary windings 422 and 423 of transformer 416. However, any displacement of either slider 401 or 403 will cause an unbalance in the currents through plates 414 and 420 and therefore a change in potential on grids 424 and 425 of the tubes 426 and 427, respectively.

Assume, for example a movement of the rudder 11, Fig. 1, to the left which will cause slider 403 to be displaced to the left and thereby increase the negative bias on grid 411, the position of slider 401 remaining undisturbed. The steady direct current and superimposed alternating current from plate 414 and therefore the current in winding 415 will decrease and thereby allow the flux from winding 421 to predominate and induce a potential across windings 422—423 of instantaneous polarity conforming to the degree of predomination of the current in winding 421 over that in winding 415.

Elements 426 and 427 are thyratron vacuum tubes which become conductive, as is well known, with depression of their control grid potentials. Accordingly thyratron 426 or 427 will "fire" depending on which of the grids 424 and 425 is made less negative than normal by the instantaneous potentials induced across winding 422—423. Motor SM Fig. 5, is the steering motor which is also shown in the assembly, Figs. 1, 2, and 23. Inasmuch as the potentials through this motor to the plates 428 and 429 of thyratrons 426 and 427, respectively, are maintained in constant phase relation with respect to potentials induced through transformer 416 due to their common connection to the supply source 406, the point in the voltage cycle at which either tube is "fired" is dependent on the magnitude and phase of the voltage across winding 422—423 of transformer 416. The motor SM may accordingly be caused to operate in either direction at any desired speed by deflecting slider 401 or 403.

The connection of the transformer winding 407 in the grid bias circuit and the use of a push-pull primary on transformer 416 to cause, during unbalances of plate current in tube 409, the induction across windings 422 and 423 of alternating voltages of proper phase and magnitude to cause the motor SM to respond to deflection of sliders 401 and 403, is an important and very useful feature of my invention. Throughout the specification and the claims, wherever it occurs, the term "parameter" shall be expressly understood as defining such circuit variants as phase, magnitude of the potential or current of the energizing voltage, and it shall also designate the frequency of alternating currents herein specified.

Any deflection of sliders 401 and 403 in the same direction increases the unbalance in the currents at plates 414 and 420 and results in an increase in speed of the motor SM. It is evident therefore that the steering motor SM responds to operation of either the rudder or the aileron or both. Conjoint operation of these controls result in greater turning rate of the motor SM than would occur with either the rudder or aileron deflected separately by a given amount. Deflections of the sliders 401 and 403 which produce equal voltage changes on the grids 411 and 417 cause no change in balance of the currents at plates 414 and 420 and no effect on the motor SM. Aeronautical maneuvers such as slips and skids may therefore be simulated inasmuch as the opposite control dispositions required in these maneuvers result in holding the turning rate of the steering motor SM at zero or allowing only rotation to the extent that the controls are disproportionately deflected in opposite directions.

While Fig. 5 illustrates a double triode vacuum tube at 409, two separate vacuum tubes may of course be employed with comparable operation. Moreover, multi-grid vacuum tubes also may be used in which grids 411 and 417 serve as the control grids.

The difference in the control responses of heavy and light airplanes may be simulated by the control circuit of Fig. 5 by adjusting the sensitivity of the circuit to any desired value in various ways such as by shunting the primary (or secondary) of transformer 416 with an adjustable rheostat 430.

Another feature of the circuit of Fig. 5 is the delay in response of the circuit to movement of slider 401 which is operated by aileron 10, Fig. 1. This introduction of delay in response is desirable in that such lagging action is a characteristic of actual aircraft. The introduction of this delay is accomplished by a condenser 431 in combination with a resistance 418. By making the resistance 418 variable as shown in Fig. 5 the degree of delay may be altered as desired. Slight leakage resistance to condenser 431 as shown at 432 may be introduced to slowly discharge condenser 431 and thereby reduce the speed of the SM motor which makes necessary the retention of a small continued pressure on the aileron to retain some charge on condenser 431 so as to hold the steering motor SM operative. The leakage of condenser 431 and the tendency thereby introduced to reduce the speed of the SM motor, resemble the recovery tendency of actual aircraft in shallow turns.

A further feature of the circuit, Fig. 5, is the rheostat 433—434 which becomes effective during opposite operation of the rudder and aileron controls to reduce the degree of delay in circuit response to aileron operation by progressively shunting the time constant resistance 418 as opposite deflection of the controls is increased. This simulates the characteristic of an airplane to "hang" on its controls during opposite control disposition. In Fig. 5, slider 435 operates conjointly with slider 401 to which it is also electrically connected. Slider 435 contacts the rheostat elements 433 or 434 only while the slider 435 is deflected from its central position. Slider 436 is operated conjointly with slider 403 by means of the mechanical connection 586 and contacts the resistance elements 437 or 438 as it deflects from its central position. If the rudder and aileron are deflected in the same direction, for example to the right, it is clear that there will be no shunting resistance across the resistor 418 because slider 435 contacts rheostat element 434 which connects to rheostat element 437 at the rudder while slider 436 does not rest on element 437 because slider 436 has been deflected to the right. However, if left rudder had been applied against the right aileron movement, slider 436 would rest on rheostat element 437 and close the shunt around resistance 418, reducing the effect of 418 and thereby the delay in response to the aileron. Moreover, increased opposite application of either control increases the reduction in delay caused by resistance 418.

The motor SM drives the rate of turn indicator 2 (Fig. 3) through the reducer gear 439, Fig. 2, and also the shaft 367, Figs. 2 and 23 which shaft may be made flexible to permit displacement of the turn indicator 2 with respect to the SM motor. The indicator 2 is a tachometer calibrated in terms of turning rate. The SM motor through gearing 332 and shaft 61, Figs. 1 and 23, also orients the course charting head 14 as described above.

The vacuum tube circuit of Fig. 6 is responsive to the aileron-elevator 10, throttle 13 and stabilizer 440 controls of Fig. 2, and is used for regulating the speed and direction of the altimeter motor ALTM, Fig. 2, which drives the rate of climb meter 3, Fig. 3, and also the altimeter 4 by means of the gearing 331, Fig. 23. The arrangement and method of operation of the circuit of Fig. 6 is similar with that of Fig. 5 except for the arrangement of input potentiometers for controlling the bias of grids 441 and 442 and other differences to be pointed out following:

Elements 443, 445, 447 and 449 are potentiometers whose respective arms 444, 446, 448 and 450 are respetcively operated by movement of the aileron control 10, Fig. 2, the stabilizer control 440, the elevator control 10 and the throttle control 13. Each of these potentiometers is energized by potential from the source 404 which may be common to Fig. 5 and Fig. 6. The resistances 451, 452, 453, 454, 455, 456 and 457, Fig. 6, are balancing and sensitivity adjusting resistances. It will be clear that with the throttle set for "cruising speed" and the remaining controls in their normal position the voltage on grid 441 of tube 458 must balance the voltage on grid 442. This requirement is satisfied when the voltage at slider 444 of the aileron potentiometer 443 is equal to the resultant of the voltages of sliders 446, 448 and 450 effective at the juncture 459. While Fig. 6 shows the aileron potentiometer 443 alone supplying bias potential to grid 442, and the stabilizer, elevator and rudder potentiometers 445, 447 and 449, conjointly supplying potential to grid 441; it is obvious that these potentiometers may be regrouped as, for example, aileron potentiometer 443 and stabilizer potentiometer 445 may have their sliders interconnected so that together they produce a resultant voltage at grid 442 which is to be balanced at grid 441 by the resultant voltage from a combination of the elevator potentiometer 447 and the throttle potentiometer 449. Resistance 460 in combination with condenser 461 provides a delay to aileron response corresponding to the time constant of that RC combination. Likewise changes in the position of sliders 446, 448 and/or 450 similarly produce a delayed potential response due to condenser 462 providing a delay effect in combination with resistances 463, 464 and 465, respectively. The operation of the remainder of the circuit of Fig. 6 and its response to unbalances in grid voltages is identical to that previously described for Fig. 5. The variable resistance 466 provides a sensitivity adjustment to modify the response of the circuit to movement of the trainer controls 10, 11, 13 and 440, Fig. 2, by varying the resultant voltage to transformer 467.

In addition to the novel method of actuating a thermionic valve circuit by means comprising potentiometers operated by the aircraft controls, the thermionic valve circuit being used to regulate the speed and direction of a motor which operates flight instruments, I have also, by a novel connection of resistances 455 and 456 to elevator potentiometer 447, rendered the trainer especially representative of actual aircraft behavior in the respect that continued back pressure on the elevator (movement of slider 448 to the right in Fig. 6) will cause a larger and larger positive potential to be applied to slider 448 until it is in the proximity of juncture 468 where resistance 456 is connected to the winding of potentiometer 447. Thereafter, additional movement of slider 448 to the right (that is, additional back pressure on elevator 10, Fig. 2) will cause the potential at slider 448 to again decrease and become more negative due to the increased effect of current from the resistor 455 which has a termination at the negative side of the supply source 404. This transition in potentials causes the altimeter motor ALTM to operate in the direction of increasing altitude until appreciable back elevator pressure is applied whereupon the effect simulated by the trainer is a "mushing" flight, until finally with further back pressure a "stall" occurs.

Condensers 469 and 470 are phase correcting condensers which also prevent interaction due to transients between Fig. 5 and Fig. 6 in which transformers 405 and 471 may be operated from the common power source 406.

The circuit for the air speed motor ASM is shown in Fig. 7 from which it will be seen that deflection of the rudder-operated slider 473 of potentiometer 472 results in a decrease in speed of the ASM motor and hence also in the air speed indication on meter 1, Fig. 3. Meter 1 is belt driven from flexible shaft 474 (Fig. 2), which is in turn driven by the motor ASM. Opening the throttle control 13 Fig. 2 causes slider 475 of rheostat 476, Figs. 7 and 1, to reduce the resistance of rheostat 476 and increase the speed of the ASM motor. Pulling back on the elevator flight control 10 Fig. 2 causes slider 477 to be moved to increase the resistance inserted by rheostat 478 and thereby decrease the current to the motor ASM. The average speed at which the trainer is "flown" may be varied by slider 479 of rheostat 480 Figs. 7 and 1. Relay LIM Fig. 7 is operated by the limit contacts LIMC1 and LIMC2 on the controller head, shown in Figs. 9 and 17. These contacts are opened by overtravel of slider 105, Fig. 9, to release the relay LIM, Fig. 7, and stop the motor ASM thereby preventing further traversement of the course charting head 14 Fig. 1 and movement of slider 105 Fig. 9, in a manner fully described above.

It will be seen from the foregoing that a plurality of branch electrical circuits are provided, each having a variable electrical means such as a potentiometer adjustable under control of the operator, such as by the usual flight controls. By such adjustment the operator is able to derive branch circuit voltages whose parameters vary in accordance with the movement or position of the controls. Under certain conditions of flight, the movement of a given control or controls not only effects a variation in the branch circuit primarily corresponding to that control or those respective controls, but also effects a variation in the branch circuit corresponding to one or more cooperatively related controls, i. e., such as aileron and rudder (Fig. 5), elevator and throttle, etc. (Fig. 6). The several branch circuits are electrically connected to a transducer which includes thermionic valves means for producing a voltage having a parameter proportional to the resultant of the parameters of the branch circuit voltages, and this in turn is used as a means of effectively determining the operation of flight condition indicators; such as the charting head 14 for indicating forward and turning movements, rate of turn indicator 2, altimeter 4, rate of climb meter 3, and air speed meter 1. Further significance of this arrangement will be better appreciated hereinafter.

*Movement of pilot compartment*

Although the motors (SM, ALTM and ASM) referred to above have been described as driving only flight instruments and a course charting head, I do not wish to be limited to these applications. The motor SM operated by the thyratron tube circuit, Fig. 5, under control of the trainer flight controls 10, 11, 13 and 440 Fig. 2 may be used to turn in azimuth any rotatable carriage or any propelled mount which is to simulate an airplane and which may embody an operator's seat, flight controls and flight instruments. Likewise, motor ALTM of Fig. 6 may be employed as a servo motor to tilt upward or downward a carriage or a propelled mount, to cause the operation of slider 481 of potentiometer 482 Fig. 6, which is polarized oppositely with respect to potentiometer 443, so as to restore balance between the grids 442 and 441 of tube 458 as the altimeter motor ALTM operates. Element 391 Fig. 6 is an operative connection between motor ALTM and slider 481 and indicates the climbing condition. A plurality of thyratron circuits may be operated from a single potentiometer input circuit comprising the arrangement of potentiometers shown in Figs. 5 and 6 by extending leads, for example, from grids 441 and 442 to similar grids of a second similar control circuit. A high resistance 390 is provided between the potentiometer slider 481 and the circuit to grid 442 to minimize interaction and permit the summation of potentials from potentiometers 482 and 443 at the grid 442. The circuit and motor ASM, Fig. 7, may be used for propelling a mobile mount to simulate the forward velocity of an airplane. The motor R. P. M., Fig. 7, operates a tachometer 596 calibrated according to the flight variant, "engine R. P. M.," to simulate an airplane engine tachometer. The motor R. P. M. is responsive to the rheostat 592 which has its slider 593 operated by the throttle control 13 Fig. 1.

*Airplane sound*

The motor R. P. M. is also under control of rheostat 594 operated by the elevator column 10 Fig. 1. In addition to operating meter 596 the motor R. P. M. may also be used to drive a sound generating system which produces tone corresponding to the noise of an engine as heard inside an airplane. One form of sound generating system is shown in Fig. 7 in which the motor R. P. M. drives a modulating disc 597 having a sound track on an optical disc. Alternative forms are a sound track on a film, on steel tape or on a phonograph record. Element 598 is a pick-up unit which may be respectively a photo-electric cell, an inductor coil or a phonograph pickup. Element 599 is a light source which is to be used when a photoelectric cell is employed as pickup unit at 598. Element 600 is a loud-speaking telephone to reproduce the tones from the sound generating system. Another alternative sound generating system is a cam operated by motor R. P. M. to vibrate a resounding board or to induce a voltage in a pickup coil. In any one of the foregoing systems, the amplitude as well as the frequency of the tones is modified as the motor R. P. M. changes speed with movement of the elevator and/or throttle controls. This change in amplitude is due to the difference in rate of cutting magnetic or light flux and the change in frequency is due to the difference in rotational speed of the element 597. This dual change in tone characteristic is desirable in that it provides realism in simulating engine sounds.

*Rough air*

While flying in a turbulent atmosphere an airplane may be abruptly displaced by inequalities in air density or movement and the airplane thereby caused to change its angle of attack, direction of flight or even its altitude. The occurrence of these disturbances is random and the displacements which they occasion vary in duration and amplitude. In simulating the effects of rough air in a trainer it is desirable that the disturbances occur in an equally random manner, degree and kind. My invention includes a novel means for applying rough air disturbances in an entirely unpredictable manner thereby not only adding to the realism of its operation but also rendering impossible any attempt by the pilot to move the controls in anticipation of the disturbances.

A motor RAM, Fig. 7, drives a plurality of paired gears 482, 483 and 484, each pair of gears having a different ratio. The gears drive cams 485, 486 and 487, respectively at speeds which differ one from the other, and the cams respectively operate contact lever springs 488, 489 and 490. As will be seen by reference to Fig. 7, the contacts of two or more cams are wired in series and thereby require simultaneous closure for completion of the circuit. Inasmuch as each cam is rotating at a different speed, the period during which the several cams will have their contacts all simultaneously closed is continually variable. Relay 491 is operated from the source 492 through switch 493 on the student pilot panel 7, Fig. 3, or by switch 494 at the instructor's position on table 8, Fig. 1. When relay 491 is operated power is supplied from source 495 to the RAM motor through contacts 496. Relay 491 in operating also connects the grid 417 of tube 409 (which is tube 409 of Fig. 5) through contacts 497 and resistance 498 to contact 499 which, when closed by cam 486, extends the connection from grid 417 to contact 500 which, if simultaneously closed by cam 485, extends the connection to contact 490 where voltage from source 404 is applied through the fractionating resistance 559 to grid 417 to increase or reduce the normal potential of grid 417 depending on whether contact 490 is closed to contact 502 or 503.

The increased or reduced voltage randomly applied in this manner to grid 417 of tube 409, Fig. 5, by cams 485, 486 and 487 Fig. 7 causes the motor SM to operate at random intervals, durations and directions thereby producing intermittent and variable turning effects on the trainer instrument. Relay 491 on closing also extends one terminal of ball bank indicator BI, Figs. 7 and 3, from contacts 504 to contact 499 from which the ball bank indicator circuit receive the same disturbing voltage as grid 417. This indicator BI normally receives deflecting voltage from slider 505 of potentiometer 506 which is operated by rudder 11, Fig. 2, and from slider 507 of potentiometer 508 which is operated by the aileron control 10, Fig. 1. If the rudder and aileron are moved together the voltage across the indicator BI may be kept at zero indicating the execution of a turn without slipping or skidding. Uneven or opposite movement of the aileron and rudder result in a net potential across BI which deflects the indicator to show the resulting skid or slip. Relay 491 in operating closes a circuit from grid 442 of tube 458 (which is tube 458 of Fig. 6) through relay contacts 509 and resistance 510 to contact 511 which on being closed by cam 486 extends the connection of grid 442 to swingspring 512 which, depending on the position of cam 485, places increased or decreased potential on grid 442 from contacts 513 or 514. Sporadic voltage increments are therefore impressed on grid 442 to cause the altimeter motor ALTM, Fig. 6, to operate so as to show a rough air condition on the rate-of-climb meter 3 and the altimeter 4, Figs. 3 and 23.

The air speed motor ASM receives changes in speed conjointly with the ALTM motor. When relay 491 is operated, it connects terminal 521 of the ASM motor to contacts 517 which, when operated by cam 486, extend the circuit from terminal 521 to the lever spring 488. With cam 485 operating lever spring 488 to contact 515, the resistance 522 is connected from motor terminal 521 to line terminal 523 through operated relay contact 496 and thereby placed in shunt across the rheostats 472, 476, 478 and 480 causing the motor ASM to receive more current and show increased air speed. However, if cam 485 is in a position which closes lever spring 488 to contact 516, a connection is made from ASM motor terminal 524 through the closed contacts of the relay LIM to resistance 520 which through contact 516 and contact 517, if simultaneously closed by cam 486, is connected through contact 518 to the opposite terminal 521 of motor ASM thereby causing resistor 520 to shunt motor ASM and reduce its speed and the indicated air speed on meter 1, Fig. 3.

The speed of the RAM motor Figure 7 and thereby the frequency of occurrence of the rough air disturbances is controllable by adjustment of rheostat 525. Potentiometer 562 controls the amplitude of the disturbances.

*Instability during stalls*

As previously described, when the elevator control 10 is operated to a back pressure position such that slider 448 of potentiometer 447, Fig. 6, passes beyond point 468, the voltage from slider 448 gradually reverses until negative potential from resistance 455 is applied to grid 441 and the ALTM motor reverses to cause the climb and altimeter to show the change in vertical air speed associated with a stall. At substantially the same time that slider 447 passes point 468, the slider 587, Figs. 7 and 1 operated by elevator control 10, contacts the segment 588 and closes a current path from source 492 to operate relay 491 and the RAM motor. Simultaneously slider 589 also operated by elevator 10, Fig. 1, leaves the contact segment 590, Fig. 7 and introduces resistance 591 in greater amount as full back elevator position is approached. This introduction of resistance renders slider 501 less effective in short circuiting resistance 562 and causes increasing rough air reaction to be applied to all flight instruments and in this novel manner there is simulated the instability of an airplane while stalling.

*Signal controller*

A conventional radio range transmits the letter A (. —) and the letter N (— .) in Morse code into adjacent quadrants in such sequence and intensity relationship that these signals overlap along four selected compass bearings to form narrow "on-course" beams. Lateral deviation from these beams results in predominance of either the A or N signal depending, respectively, on whether the deviation is into a contiguous A or N quadrant. Assuming the deviation from the on-course beam is into an A quadrant, the A signal will increase in volume while the N signal becomes weaker. This reduction in N signal strength continues to approximately one-third of the angular width of the quadrant where the signal fades to zero. Thereafter substantially only an A signal is heard and this increases in intensity until the bisector of the quadrant is reached. As the flight is continued across this bisector the A signal starts to decrease in intensity. When the flight has reached a position approximately one-third the quadrant width from the next on-course beam, the N signal again becomes audible and continues becoming louder until it again equals the A signal forming another on-course beam. The areas adjacent to a beam and within which both signals can be heard, one louder than the other, are the bi-signal zones. As indicated above, the width of these bi-signal zones is approximately one-third the width of the respective quadrants. All signals increase in strength as the center of the radio range is approached. Directly above the antennas or towers there is a cone of silence, a limited area shaped like an inverted cone, in which all signals fade out. As the aircraft leaves the cone of silence the signals surge back with great volume before they begin to fade as the distance from the station increases.

Sometimes there is a momentary reduction or fading of the signals, or a false cone of silence, at other points along the airway due to atmospheric or local disturbances. To avoid any uncertainty from this cause as to location of the center of the radio range, many ranges are equipped with a Z type marker beacon which emits a distinctive signal in the cone of silence. "Fan" type marker beacons which transmit a fan-shaped radio pattern across the equi-signal zone are often placed 20 miles from the center of the range. The markers around any given radio range station are identified by a succession of single dashes, or by groups of two, three or four dashes to indicate the particular course of the range.

Multiple courses exist at some locations, particularly in mountainous country. That is, the equi-signal zone, which is normally about 3° in width, may be broken up into a number of narrow on-course bands with a total spread of 10° or 15° or even more. A related difficulty is found in bent courses. If the aircraft continues in straight flight under these conditions, the range courses seem to be swinging from side to side.

Wind causes drift of aircraft over a range and if of appreciable velocity may, in certain conditions of flight, lead the pilot to believe he was on a different course of the range than was actually the case.

To identify the particular range in which a flight is conducted, the A and N signal sequence is interrupted after each twelve successive transmittals to project station identifying signals first in the N pair of quadrants and then in the A quadrants. These signals consist of two letters in continental code. A complete cycle requires 37 seconds. Of this period, 25 seconds are used for the twelve A and N transmittals and twelve seconds are utilized for the station code.

Provision is made at most range stations for simultaneously broadcasting voice with the range signals so that weather reports or other information may be transmitted to the airway.

Inasmuch as like signals are transmitted into opposite quadrants of a range it becomes necessary to identify the quadrant in which the aircraft is flying. It is also necessary to find a range course as quickly as possible from the unknown position. This establishment of position is referred to as orientation.

Orientation may be practiced on the apparatus of my invention which in this part comprises a pantograph 15, Figs. 1 and 2, mounted on the fixed pivot 64, Fig. 31, attached to the traversing table 8 and having a course charting head 14 whose position and movement on the table depict the position and movement of the aircraft on the radio range, said movement being accomplished by hand or by means responsive to manipulation of the controls 10, 11 and 13 as previously detailed herein: The pantograph 15 in following the movement of the course charting head 14 moves the pin 29' (Fig. 11) and thereby operates signal controller 16 (Figs. 1, 2, 8 and 9) which by virtue only of the positioning of pin 29 varies the relative intensities of the A, N, station identification, Z and fan marker signals to correspond to those that would be received by an aircraft in like position on an actual radio range, as will be more particularly described hereinafter. The effects of wind drift and beam irregularities may be introduced by displacing the signal controller as in the slide rails 17 (Fig. 1). The automatic regulation of the signals has great usefulness in that it dispels the confusion which has heretofore existed both in the student and his instructor due to the inevitable lag and errors which attend attempts by the instructor to manually vary the signal strengths to conform to the student's movement of the charting head 14 about the table. In addition the signal controller 16, because of its automatic operation, eliminates the need of the skilled instructor heretofore required for the manual variation of the signal strengths. The freedom from need of such attendant not only provides more satisfactory and economical operation, but makes possible the operation of an orientator from a coin collector switch rendering the orientator operative for a timed interval.

Referring to Fig. 18 the oscillator OSC, produces a tone at approximately 1000 cycles per second to the complete winding of the potentiometers of the signal controller 16, shown in simplified form at A1 and N1, but shown in detail in Fig. 34 and described later; through the slide wire rheostat SIL shown also in Fig. 9 and 10. A path for this tone to the telephone circuit, Fig. 21 may be traced from the A1 potentiometer, slider 97 and the N1 potentiometer, slider 98, Fig. 18, through the interrupter 371, Fig. 18, to leads A and thence to Fig. 21 and the telephone 222. The contact assemblies I, TRN, RNG, and AN are operated by cams driven by a suitable motor (not shown). The AN contacts interrupt the steady tone from the A1 and N1 potentiometer arms 97 and 98 respectively into A and N signals respectively and pass this current through the swing spring 99 of the AN contact assembly to the RNG contact 1 and thence to the No. 2 lead to Fig. 21 and the receivers 222. After twelve A and twelve N signals the range contacts RNG operate to transfer the head receiver lead No. 2 from the AN springs to the identification contact assembly I which interrupts tone received first from potentiometer N1 through the make contact 2 of the transfer spring TRN and then from the A1 potentiometer through the break contact 1 of the transfer spring TRN, which thereby transmits the station identification signal formed by the cam operated contacts I first to the N channel and then to the A channel.

Figure 8:
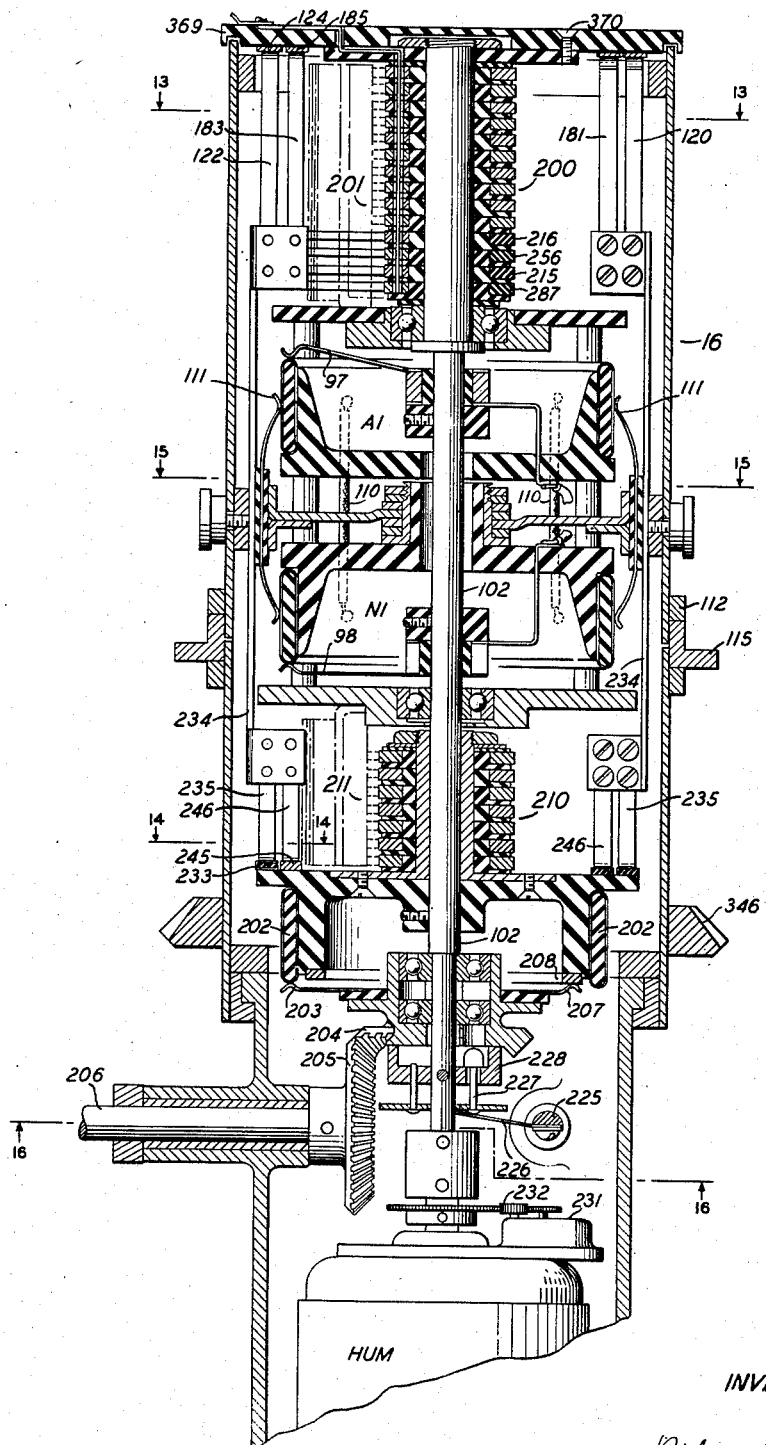
Fig. 8 is a vertical section of the controller on line 8—8 of Fig. 1.
Figure 13:
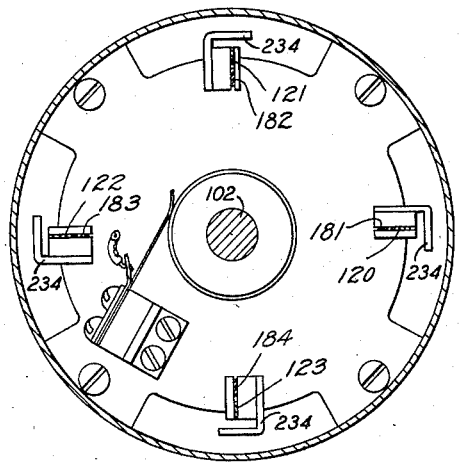
Fig. 13 is a sectional view on line 13—13 of Fig. 8

The controller consists of two attenuating elements A1 and N1 and operated by a common shaft 102 as shown in Figs. 8, 18 and 34. This shaft is rotated by the grooved arm 103 shown in Figs. 1, 9 and 11. Sliding in the groove of this arm is a ball bearing 104, Figs. 10, 11 and 17 attached to the pantograph 15, Figs. 1 and 2, by pin 29, Fig. 1. Any movement of the course charting head 14, Figs. 1 and 2, causes a proportionate movement of pin 29 and hence a displacement of the slide 105, Fig. 9, in the groove of the controller arm 103 and/or rotation of the arm 103. If the head 14 traverses so that pin 29' moves in a line directed substantially through the center of the controller shaft 102, the center being indicated at 106, Fig. 9, there will be insufficient or no side pressure on the arm of the controller to rotate it the 180° which are necessary to permit the ball bearing to continue its travel. To provide the required rotation of the arm 103 in such instances a hunting motor HUM, Figs. 8 and 17 is connected to the controller shaft 102. This motor is under control of the hunting contacts, HUC, Figs. 10 and 17. These contacts extend along the sides of the grooved arm 103 and are of such length that they may be contacted by the bearing 104 whenever the bearing is near the center 106 of the controller shaft 102. The bear 104 carries current received from a source of power included in 330 and when it exerts side pressure against either HUC contact power is supplied to the hunting motor HUM which rotates in the direction of the HUC contact. Any over-rotation will cause the slide to contact the opposite HUC contact and operate the motor in a reverse direction. Thus the HUM motor causes the arm 103 of the controller 16 to hunt between the HUC contacts. To assure rotation of the arm 103 in the event the movement of the pantograph 15 is so rapid that the arm can not immediately follow, an additional safety make contact is provided at the limit contact LIMC1. Operation of this contact LIMC1 by overtravel of the slide 105 beyond the controller center 106 causes the motor HUM to rotate the arm 103 until the slide 105 snaps away from the LIMC1 contact. This snapping action results from the slide 105 having passed the pivoting center 106 of the controller arm 103.

If the slide 105 of the controller 16 over-travels to reach either end of the arm 103, the (break) limit contacts LIMC1 and LIMC2, Fig. 17, operate to release contact 524 of the LIM relay, Fig. 7, which is a part of apparatus 330, Fig. 17, and removes power from the ASM motor, Fig. 7 to stop tractive wheel 65, Fig. 32.

Attached to the slide 105 of the controller arm is the spring 108, Figs. 9, 10 and 18, which contacts the resistance SIL. This resistance may be taper wound to cause rapid increase in signal strength as the center of the arm is approached. The pivot center 106 of the controller arm 103 corresponds to the center of the radio range. The winding 109 of the resistance SIL is terminated just short of the center 106 of the arm, causing the signal circuit to open near the center and form a cone of silence over the center of the range.

The on-course beams, the bi-signal and pure signal intensity distributions simulating the signals of a radio range are obtained from the A1 and N1 potentiometers of Figs. 8, 18 and 34, as follows. Inasmuch as the potentiometers are shown as positioned in Fig. 8, the diagram of Fig. 20 shows the connections juxtaposed, the sliders 97 and 98 travelling together as shown in Fig. 34 by solid arrows respectively or by dotted arrows respectively.

The leads 1 and 2 of Fig. 34 are the leads 1 and 2 of Fig. 18. Current from oscillator OSC passes through key 297 and is transmitted to lead 1 and to the attenuating resistor SIL, Fig. 18. Current from SIL enters potentiometers A1 and N1 over leads 2. The leads 3' and 4' of Fig. 34 are the leads 3' and 4' of Fig. 18 and after passing through the key 297 connect to the interrupter 371. The sectors A and C, Fig. 34 form the "A" signal quadrants of the radio range and the sectors B and D form the "N" signal quadrants of a radio range. The points $a$, $b$, $c$, and $d$ correspond to the bearings of the range courses.

Figure 15:
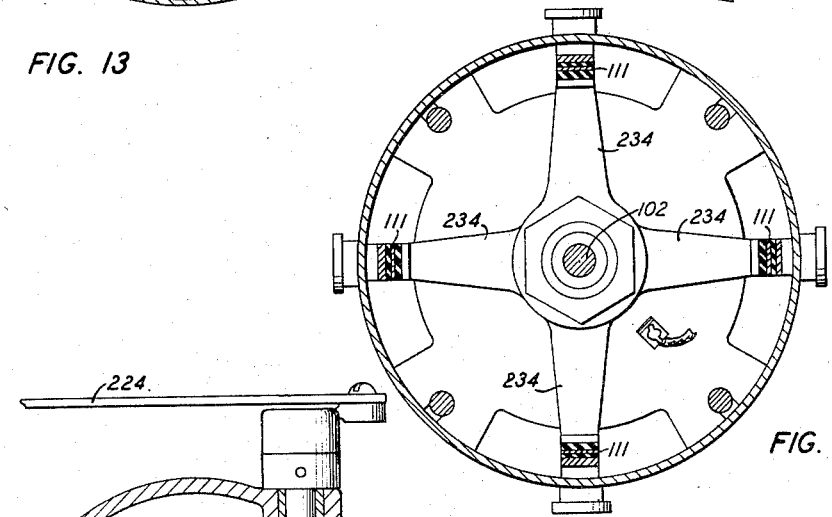
Fig. 15 is a sectional view on line 15—15 of Fig. 8.
Figure 16:
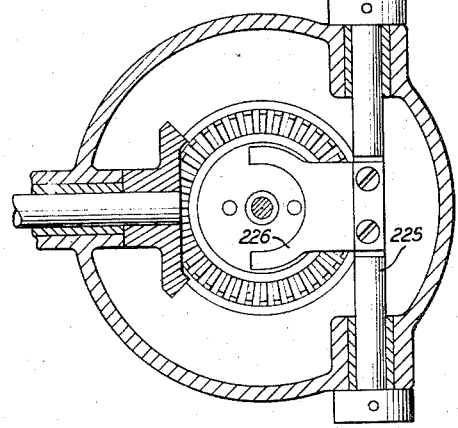
Fig. 16 is a sectional view on line 16—16 of Fig. 8.

Connection from oscillator lead 1 to the potentiometers A1 and N1 is at the points where the "A" and "N" signal current is to be a maximum. This is approximately at the bisector of each quadrant or the points $u$ and $x$ on the A1 potentiometer and $n$ and $q$ on the N1 potentiometer. Some of the common connections between the A1 and N1 potentiometers are shown at 110 on Fig. 8. Inasmuch as the bi-signal zones are formed by overlapping of the N signal in the A quadrants, the tone return connections to lead 2, Fig. 34 are made in the quadrants adjacent to those having tone input connection from lead 1. These return connections are shown at $v$, $w$ and $y$, $z$ on the A1 potentiometer and at $l$, $m$ and $o$, $p$ on the N1 potentiometer, Fig. 34. The points of return tone connection are at approximately ⅓ the angular quadrant width from the beam points $a$, $b$, $c$, and $d$, so as to provide a bi-signal zone in which the fading signal attenuates to inaudibility at about one-third the angular width of the quadrant. At the points $a$, $b$, $c$, and $d$ corresponding to the bearings of the range courses, the potential of the tone current in both potentiometers must be equal. This may be accomplished by properly proportioning the impedance around the windings of the potentiometers. However, a method which I prefer for establishing potential equality between the corresponding points $a$, $b$, $c$ and $d$ on the A1 and N1 potentiometers respectively is to strap them together. By making the position of these straps adjustable, one signal controller can be employed for duplicating the signal distribution of any of a large number of ranges having different course bearings. In my apparatus I have made the straps adjustable by making them movable elements, two of which are shown at 111, Fig. 8 and all four at 111, Fig. 15. To assist in the proper positioning of the elements 111, I have indexed the ring 112, Fig. 8, to show compass bearings.

With the above potentiometer connections and the resistance SIL it will be seen that as the controller shaft is rotated through 360°, a signal pattern will be obtained which duplicates the pattern of actual radio ranges.

A support 115, Fig. 8 is provided in which the controller 16 is rotatable. This support is indexed with respect to the ring 112 so that the degree of rotation of the controller in the support can easily be read. Rotation of the controller in the support has the effect of rotating the entire radio range with respect to the traversing table, which is a feature that is useful in certain training exercises. However, a still more important feature is made possible by this arrangement, namely, the simulation of bent radio beams and curvilinear wind drift.

The controller is mounted by support 115 in the guide rails 17, Fig. 1, which permit lateral displacement of the controller, thereby making it possible to shift the position of the simulated radio beam with respect to the simulated position of the aircraft on the course as represented by the position of the charting wheel 65, Fig. 32, on the traversing table 8. Thus I can create the effect of double beams, dog-legs, and similar irregularities of the range by shifting the controller in the guide 17 during the flight of the trainer. Wind drift may be introduced by continuous movement (manual or otherwise) of the controller 16 along the guide. Figs. 1 and 2 show a motor 180 (WDM) with reduction gear 184 and connecting link 182 for mechanically displacing the controller 16 in the guide rails 17 by means of cord 181.

Since it is possible to rotate the entire range by rotating the controller in the support 115, one set of guide rails 17 are required to obtain windage in any direction.

New and useful improvements to this apparatus described herein include means for simulating a radio compass, a radio direction finder and an automatic direction indicator; means for simulating a blind landing glide and localizer beam; means for producing and controlling visual and audible signals simulating a Z marker, inner and outer fan markers and similar position markers. It is moreover, a novel feature of my invention that these various means may be provided in combination in a unitary controller. In this application Figs. 8 to 16 inclusive and Fig. 23 illustrate the mechanical elements of the improved unitary controller and Figs. 17 to 22 inclusive disclose the circuit features.

There are four adjustable straps for setting the angular direction of the "on course" radio beams; two of these straps 111 are shown in Fig. 8. The revolving arm assembly, Fig. 9, is fixed to the rotating plate 369, Fig. 8, by screws 370, Figs. 8, 9 and 10. The attenuating resistance SIL, Figs. 9, 10 and 18, reduces the loudness of the A and N signals as the airplane recedes from the axis 106, Fig. 9, of shaft 102, Fig. 8, which represents the center of the radio range station. Electrical connections between potentiometers AI and NI and the attenuating resistance SIL extend through the collector rings 360 and 361, Fig. 18 which are a part of the collector ring assembly 200, Fig. 8, and the collector brush assembly 201. The bracketed leads at A, Fig. 18, of this application connect to the bracketed leads A, Fig. 21, herein and thereby transmit signal current from Fig. 18 to the transformer 251 of Fig. 21 and to the receiver 222. It is frequently desirable to simulate the effects of electrical disturbances such as static on the received signals. To reproduce this effect a carbon rod 314, Fig. 18 herein, may be rotated by motor 315 through reducer gear 316 to modulate current from the signal oscillator OSC which passes through contacts 317 and 318 which rub on the rod and produce "frying" in the circuit due to the variable contact resistance of brushes 317 and 318 on the carbon rod 314. The extent to which this static generator modulates the signal is controllable by potentiometer 319. The hunting motor HUM Figs. 17 and 7 operates from contact HUC, Figs. 10 and 17, herein, in the manner described above. The limit contacts LIMC1 and LIMC2 operate as disclosed above. A fly ball friction governor 231, Fig. 8 driven by motor HUM through the step-up gear train 232 prevents excessive angular velocity of shaft 102 when slider 105, Figs. 9 and 10, approaches the axis 106, Figs. 9 of shaft 102.

*Automatic radio compass*

The axis 106, Fig. 9, of shaft 102, Fig. 8, represents the center of the radio transmitting station simulated by the controller and the axis of pin 29', Figs. 10 and 11, operated by pantograph 15, Fig. 1, represents the location of the airplane. Hence the direction from pin 29' to the axis 106 is at all times the bearing of the airplane to the radio station. Inasmuch as pin 29' operates arm 103, Fig. 9, about axis 106, the azimuthal position of arm 103 is the cobearing of the airplane to the station. Applicant utilizes this relation to provide means for simulating automatic radio compass equipment.

*Radio direction finder*

To provide means for simulating a radio direction finder a potentiometer 202, Fig. 8, is mounted on shaft 102 and by rotating therewith is continually oriented by arm 103 Fig. 9. The slider 203 Fig. 8 contacts potentiometer 202, said slider being affixed to gear 204 which is rotatable with respect to shaft 102 by means of gear 205 attached to shaft 206. Brush 207 is electrically connected to slider 203 and contacts collector ring 208. External connections to potentiometer 202 are from slider brush 203 and points 212 and 218, Fig. 20. These connections are made through collector rings 362, 363 and 364 Fig. 20 which are a part of collector ring assembly 210 and brushes 211, Fig. 8. It will clearly be seen from Fig. 20 that the connections to potentiometer 202 form a Wheatstone bridge circuit wherein points 212 and 213 are the potential points at which direct current is supplied from source 214 through choke coil 385 and alternating current is supplied from oscillator 386 through condenser 387 whereas points 218 and 219 are equipotential points at which visually indicating galvanometer 221 or an audible receiver 222, Fig. 21, connected through the wiring bracketed at C, Figs. 20 and 21, will give zero response. The choke 392, Fig. 20, prevents alternating currents from flowing through galvanometer 221 and the condenser 393 prevents the flow of direct current in the circuit to the receiver 222. In the controller 16, Figs. 1 and 8, the connections from points 212, 213 and 218, Fig. 20, are permanent whereas the balance point 219 which is equipotential to point 218 must be found by rotating slider 203 until the galvanometer 221 or the receiver 222 give zero response. Potentiometer 202, Figs. 20 and 8, and thereby point 218 is rotated conjointly with arm 103, Fig. 9, hence the position of slider 203 at electrical balance will show the direction of arm 103. Since slider 203 is rotated by the unity ratio gears 204 and 205, Fig. 8, which are operated by shaft 206, a compass card 299, Fig. 3, operated by an extension of shaft 206 will indicate the position of slider 203 and thereby the bearing of the airplane to the station, thus providing a radio direction finder.

*Automatic radio direction indicator*

If it is desired to simulate an automatic radio direction indicator it is only necessary to position slider 203 to point 219, Fig. 20, on potentiometer 202 and then lock the slider 203 to potentiometer 202 causing them to be rotated together by controller shaft 102, Fig. 8, which is operated by arm 103 from pantograph pin 29', Figs. 1 and 9. The locking of slider 203 to the potentiometer 202 is effected by pulling knob 303, Figs. 3 and 23, to operate bar 224 and thereby shaft 225, Figs. 16 and 8 which presses upwardly on spring 226 which engages the pin 227, Fig. 8, carried by shaft collar 228 with gear 204. The shaft collar 228 and the gear 204 so locked together will cause gear 204 to be driven by shaft 102. The gear 204 drives gear 205 and thereby shaft 206, Figs. 8 and 23, causing gear 305, Fig. 23, to drive gear 306 and shaft 307 through the differential 308. The clutch 309 attached to shaft 307 drives gears 315 and 316 and the compass card 300, Figs. 23 and 3, which continually shows the bearing of arm 103 and accordingly provides an automatic radio direction indicator which constantly shows the bearing from the airplane to the radio station.

*Fixed loop radio compass*

A "radio compass" on an airplane comprises a loop antenna non-rotatably mounted in a fixed position on the airplane and thereby requires that the entire airplane be turned to orient the compass. To simulate such a radio compass on the trainer it is necessary that slider 203 of the potentiometer 202, Fig. 8, be driven in azimuth conjointly with the steering shaft 61, Figs. 1, 2, and 23, which is driven by the SM motor. This is accomplished by pulling lever 302, Figs. 23 and 3, which operates the arm and rack 310, Fig. 23, turning gears 317 and levers 318, to engage clutch 319 causing shaft 61, driven by the SM motor, to drive gears 320 and 321 and thereby shaft 307 which drives gears 306 and 305 through differential 308. Gear 305 drives shaft 206, Fig. 23, and hence gears 205 and and 204, Fig. 8, and thus slider 203. To determine the bearing of a radio station or to direct the airplane toward the radio station, the airplane is turned by operation of the aileron and rudder controls until shaft 61, Fig. 23, has rotated slider 203, Fig. 8, to the null point position as determined by galvanometer 221 or receiver 222 Figs. 20 and 21.

As an alternative to using a null point galvanometer, a voltmeter 221', Fig. 20, may be employed which has one of its terminals connected to point 213 (or 212) as shown in Fig. 20, the other being connected through slip ring 208 to the slider 203 a before. With correct battery voltage, the meter 221' will show center deflection when the slider is midway between points 212 and 213 and will deflect in the direction that the slider is displaced from said midpoint.

*Radio compass simulation by syncro-elements*

Figure 24:
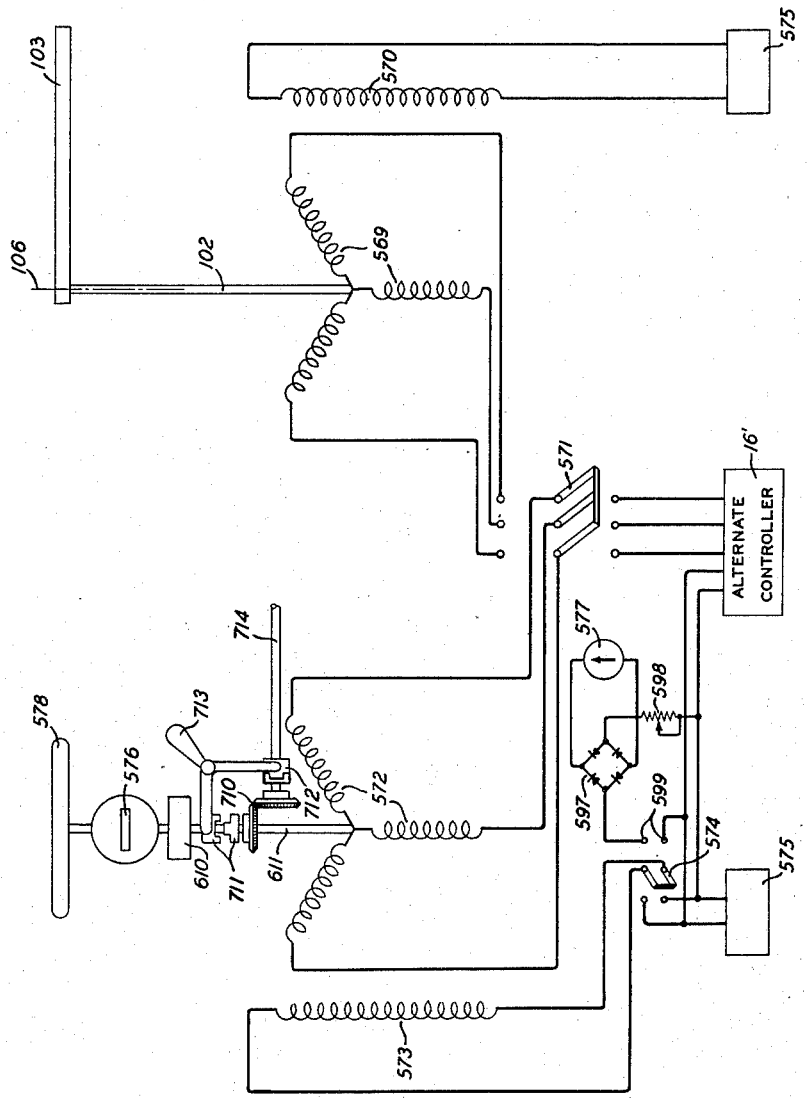
Fig. 24 is an alternate method of control to Fig. 8.

In Fig. 24 I have disclosed an alternative method for simulating radio compass equipment. A continual indication of the orientation of arm 103 and thereby the bearing of the airplane with respect to the radio station represented by axis 106 of shaft 102 may be obtained by Selsyn type motors. The windings 569 and 570 represent the rotor and stator respectively of a Selsyn type transmitter connected to shaft 102 of controller 16. By means of switch 571, rotor 572 of a repeating Selsyn may be directly connected to rotor 569; stator 573 may be energized through switch 574 from the same power source 575 as stator 570. Rotor 572 will then orient itself continually in accordance with rotor 569. Attached to rotor 572 is a compass card 576 which may be mounted on dash-board 7, Fig. 3 (in place of compass 300) and be used for constantly showing the position of the radio station with respect to the airplane and therefore as an automatic radio direction indicator. If two controllers such as 16 and 16', Figs. 1 and 2, are used for reasons subsequently to be described in this specification, switch 571, Fig. 24, may be operated to connect the rotor 572 to the transmitting rotor of either controller. Rotation of the body of controller 16 rotates the stator 570 of the transmitting Selsyn with respect to the rotor 569 and therefore automatically causes a corresponding shift in the zero position of the receiving Selsyn. Hence, if it is desired to rotate the north reference direction on the plotting board 8, Fig. 1, by rotating controller 16 in its support 115, Fig. 8, as previously described for changing the direction of wind drift, the compass card 576, Fig. 24, will automatically be corrected to the new reference direction and will show correct bearings when arm 103, Figs. 24 and 1, of controller 16, Fig. 1, is moved with respect to the new reference direction.

*Radio direction finder using syncro-elements*

To simulate a radio direction finder by means of the Selsyn motors of Fig. 24, it is only necessary to operate switch 574 to terminals 599 thereby connecting the stator 573 to the circuit of the unbalance indicator 577 and to rotate compass 576 and conjointly rotor 572 by means of handwheel 578 through clutch 711 engaged by lever 713 until indicator 577 shows no deflection. The operation of the unbalance indicator circuit is as follows. The resistance of rheostat 598 is such that voltage from source 575 when applied through stator winding 573 (switch 571 being open) and rectifier 597 will cause meter 577 to deflect to its central scale position which is the "null point" position. Switch 571 being thereafter closed permits voltage to be induced in winding 573 from current in rotors 569 and 572. The phase of the voltage in stator 573 is dependent on the angular position of rotor 572 with respect to stator 573 and since the potential applied to indicator 577 is the vector sum of the voltages from stator 573 and source 575, the meter 577 will deflect from its central null point position in correspondence with angular movement of rotor 572 with respect to rotor 569. At the null position, rotor 572 has quadrature orientation with respect to rotor 569 and compass 576 if displaced by 90 degrees by means 610 will therefore show the co-bearing of arm 103 and hence the bearing from the airplane to the radio station.

*Radio compass using syncro-elements*

To simulate a radio compass wherein the entire airplane must be turned to direct the loop antenna, it is only necessary to drive the rotor of a receiving Selsyn such as rotor 572, Fig. 24, from a shaft which has the same orientation as the course charting device 14, Fig. 1. For example, instead of manually turning rotor 572, Fig. 24, by handwheel 578, the clutch 711 may be disengaged by lever 713 and clutch 712 engaged so that shaft 611 will be driven through gears 710 by shaft 714 which, by suitable means (not shown), may be directly connected to shaft 61, Figs 1 and 2, said shaft 61 being the steering shaft for the course charting device 14. Stator 573 of the receiving Selsyn is connected to the circuit of indicator 577 in the same manner as previously described for operation of the radio direction finder. By means of the rudder and aileron steering controls, the course charting device 14, Figs. 1 and 2, which represents the airplane, is rotated in azimuth until the indicator 577 is at its null point position at which orientation the compass 576 will show the bearing or co-bearing of the airplane to the simulated radio station.

While Fig. 24 shows the three phase winding of each Selsyn as being the rotor of the Selsyn it is obvious that the circuits and application of the Selsyns will be identical if the Selsyns are constructed with the three phase winding on the stator and a single phase winding on the rotor as is frequently the case.

*Glide beam*

An effective embodiment of my invention is means for providing a glide beam which operates either a cross-pointer indicator of conventional design or an oscilloscope tube for indicating the position of the airplane with respect to the glide beam as in the Lorenz landing system. Inner and outer fan marker signals also are provided. These signals are all changed automatically by the signal controller as the pilot operates the trainer flight controls. To show horizontal deviations from the center of the glide beam, a potentiometer element 233, Figs. 8, 14 and 19 having a narrow angular length is mounted to be rotatable with shaft 102. Usually a glide beam is located in line with one of the "on course" beams of a radio range station and to assure this alignment, the wiper contacts 235 Fig. 14 which contact the winding of potentiometer 233 Fig. 14 as it passes under them are attached to the supports 234, Figs. 8, 13 and 14 which carry the beam position adjusting straps 111. However, as seen from the circuit diagram, Fig. 19, a switch 236 is provided which opens the circuit to all but one of these wipers leaving a path closed only to the wiper 235 located on the beam directed toward the landing field. Power from source 237, Fig. 19, is placed across potentiometer 233 through collector ring 366 which is a part of collector ring assembly 210, Fig. 8. The vertical pointer 238, Fig. 19, of a crosspointer indicator is connected so that when the center turn of the winding of potentiometer 233 is under the wiper 235 selected by switch 236, the pointer 238 of said indicator will be deflected to the vertical position as shown in Fig. 19. Movement of the airplane either to the right or left of the center of the beam as represented by movement of pin 29' of pantograph 15 Fig. 1 to the left or right causing arm 103 Fig. 9 to be moved to the left or right, will cause a similar displacement of potentiometer 233 Figs. 8 and 19 to the left or right of wiper 235 and thereby change the voltage at indicator 238 causing it to show said deviation.

Vertical deviation from the beam is shown by deflection of the horizontal pointer of a crosspointer indicator and such deviation is automatically indicated in the trainer by means disclosed below. A potentiometer element 239 is mounted in altimeter 4, Figs. 3, 23 and 19, one end of the potentiometer winding terminating at a point 612 in the altimeter corresponding to the elevation of the landing field above datum and the other end 252 of the potentiometer winding terminating at the altitude to which it is desired that the glide beam extend. The position of the potentiometer card 239 Figs. 23 and 19 is adjustable with repect to the zero altitude position of the altimeter so that the lower end 612 Fig. 23 of the potentiometer may be set at the elevation of the landing field above zero altitude. The shaft 290 of altimeter 4 carries the slider 240 of potentiometer 239 and positions said slider on the winding of potentiometer 239 in accordance with the indicated altitude of the airplane. Connections to potentiometer 239 and slider 240 are shown schematically in Fig. 19 and Fig. 22. Another potentiometer element 241 is mounted adjacent to bar 103 of the signal controller 16, Figs. 9, 10 and 19. The position of end 242 of potentiometer 241, Fig. 19, represents the landing end of the glide beam and 243 represents the end of the glide beam where it may first be intercepted in the air. These end points 242 and 243 are contacted by wiper 244 of slider 105, Figs. 9 and 10 at distances from the axis 106 of controller shaft 102, corresponding to the length of the glide beam and its location from the radio station. Potentiometer 241 is connected in series with potentiometer 239 through slip ring assembly 305 as shown schematically in Fig. 19. Power is supplied to these potentiometers from the series source 247. One terminal of the horizontal element 238' of the crosspointer indicator is connected to wiper 240 of altimeter potentiometer 239. The other terminal of 238' connects to switch 248 which is operated together with switch 236 from a common shaft 249 and selects the wiper 246' of group 246, Figs. 8 and 19, on which the glide beam is to be located. Detail 250, Figs. 12 and 19, is a contact bar from which wiper 244 makes contact to potentiometer 241.

Figure 14:
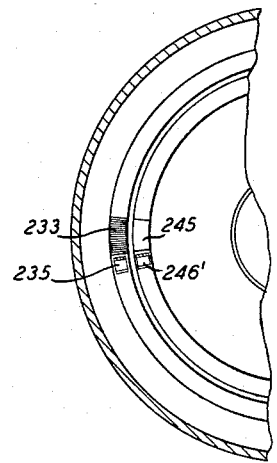
Fig. 14 is a sectional view on line 14—14 of Fig. 8.

Connection to bar 250 is through a narrow segment 245, Figs. 8, 14 and 19, which is rotated by shaft 102 and hence continually remains oriented with bar 103, Fig. 9. Segment 245 is made of an angular width corresponding to the average angle subtended by the glide beam potentiometer 233 as seen from the radio range station and limits operation of indicator pointer 238' to this angular displacement. Potentiometer elements 239 and 241 are constructed to have approximately equal ohmic resistance. Accordingly, when wiper 240 is at the high altitude end 252 of potentiometer 239, Figs. 19, 23 and 22, and wiper 244 is at the corresponding end 243 of potentiometer 241, the voltage across the horizontal element of indicator 238' is one-half the voltage of source 247 and the pointer of 238' will be in a horizontal position indicating that the airplane is at the proper altitude for the distance it is out on the glide beam. Likewise, when the airplane is at the other end of the glide beam, namely, has landed on the runway, there will again be one-half of the voltage of source 247 across indicator 238' showing that the airplane is still at the proper altitude for the distance out on the runway. If the potentiometer cards are linearly wound, and the altitude of the airplane is decreased in proportion to its forward glide, the horizontal pointer 238' will continually receive one-half the voltage of source 247 and 238' will remain centered. However, if altitude is lost too rapidly, as shown in the simplified diagram of Fig. 22, with indicator 238' at A, less than one-half voltage will be received and the horizontal pointer 238' will show the airplane to be below the center of the glide beam; and vice versa the condition will be as shown at B for a glide that is too shallow. Curvilinear glide paths may be simulated by suitably varying the resistance distribution of the potentiometers 239 and 241. If, for example, a downward concave beam is desired, potentiometer 239 may be wound with increasing resistance increments at decreased altitude.

A cathode ray oscilloscope 311, Fig. 19, may be operated from potentiometers 233, 239 and 241 by amplifying the voltage received at the vertical element of indicator 238 and placing said voltage across the plates 312 which control the horizontal deflection of the beam of a cathode ray oscilloscope tube and similarly amplifying the voltage at the horizontal element of indicator 238' and placing said amplified potential across the plates 313 which deflect the beam of an oscilloscope tube vertically. The resulting deflection of the cathode beam indicates the position of the airplane with respect to the center of the glide beam.

*Marker signals*

Figures 21, 22:
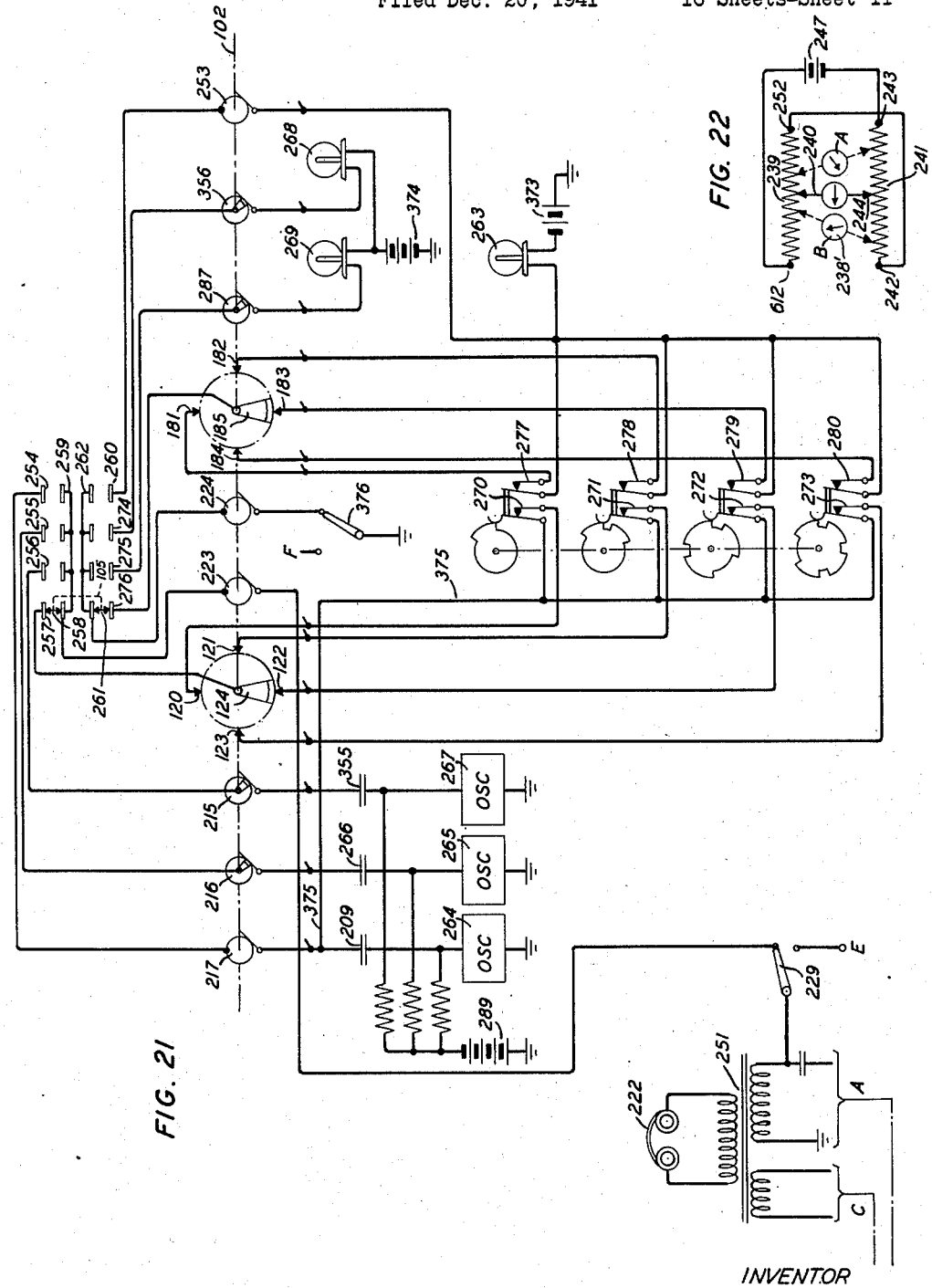

A station Z marker signal is obtained when wiper 258, Figs. 9 and 21, is brought into alignment with contact 254 which occurs when slider 105 transits the cone of silence position, that is, when pantograph 15, Fig. 1, places pin 29' in the immediate proximity of the axis 106 of shaft 102, Figs. 9, 10 and 8. Tone from oscillator 264, Fig. 21, is then transmitted through condenser 209, slip ring 217, contact 254 and wiper 258 to common contact 259 and slip ring 223 from which said tone is transmitted through switch 229 and transformer 251 to receiver 222. Wiper 261 is operated conjointly with wiper 258 by slider 105, Fig. 12, and accordingly wiper 261 cooperates with contact 260, Fig. 21, when slider 105 is at the cone of silence position. A circuit is then closed from ground through slip ring 224, contacts 262, 261 and 260 and through slip ring 253 to lamp 263 which lights from power received from source 373. The slip rings 217, 223, 224 and 253 of Fig. 21, and the slip rings 357, 358, 359, 360, 361 and 365 of Figs. 17 and 18 are a part of slip ring assembly 200 and brush assembly 201, Fig. 8.

Similarly, audible and visual indications are transmitted when passing over a glide beam fan marker such as simulated by contact 255, Figs. 9 and 21. This contact represents an "inner" marker. When wiper 258 cooperates with contact 255, tone from oscillator 265 is transmitted through condenser 266 and commutator ring 216 through contacts 255 and 258 to the common receiver contacts 259 and to receiver 222 as described for the station marker signal above. Concurrently, wiper 261 has been positioned adjacent to contact 274 and lights inner marker lamp 268 from power source 374 by transmitting ground from common contact 262 through commutator 356. Commutators 216 and 356, Figs. 21 and 8, are of the correct width and orientation with respect to arm 103 to respectively limit the width of the audible and visual marker signals to correspond to the width of such a signal beam on a radio range and to also position the marker signals on the beam on which they are to occur.

Likewise, an "outer" fan marker audible glide beam signal is furnished by oscillator 267, Fig. 21, through contact 256, Figs. 21 and 9, under control of wiper 258 and commutator 215 while contact 275 provides a visual "outer" marker signal by lighting lamp 269 under control of wiper 261 and commutator 287.

Coded fan marker signals are transmitted by contacts 257 and 276, Fig. 21, when slider 105, Figs. 9 and 12, positions wipers 258 and 261, Fig. 12, into alignment with said contacts. Coding of the audible signal is by cam-operated contacts 270, 271, 272 and 273, Fig. 21, which receive tone from oscillator 264 through condenser 209 and lead 315. After being coded, said tone is transmitted to brushes 120, 121, 122 and 123, Figs. 21, 13 and 8. These brushes are supported by spiders 234, Fig. 15, which carry the radio range beam locating straps 111 so as to cause the coded fan markers to occur on the "on course" radio beams regardless of the positions to which said beams are adjusted. Commutator segment 124, supported on shaft 102, Fig. 8, is revolved by arm 103, Fig. 9, in accordance with the path of the airplane as represented by pin 29', Figs. 1 and 9. Coded tone is therefore transmitted from whichever of contacts 120, 121, 122 or 123, Fig. 21, is on the flight path of the airplane. From commutator segment 124 the coded tone is transmitted through contact 257 and wiper 258 through slip ring 223 to switch 229 and receiver 222. Switch 229 is for transferring the receiver transformer 251 from one controller such as 16, Fig. 2, to another controller such as 16', Fig. 2, connected to lead E, Fig. 21, the provision of said second controller being for purposes subsequently described.

Similarly, a visual coded signal is flashed by lamp 263 Fig. 21 as the airplane transits one of the four fan markers represented by contacts 181, 182, 183 and 184 Fig. 21. The coding is by the cam-operated contacts 277, 278, 279 and 280 and selection is by commutator 185 which is oriented conjointly with commutator 124 by arm 103, Fig. 9.

Switch 376 Fig. 21 is provided for transferring the visual signal circuit from one controller to another, the second controller being connected to lead F, Fig. 21 said second controller serving the purpose subsequently described. Where common strapping is shown, these straps are to like connections on additional controllers.

Source 289 Fig. 21 is a common plate battery for oscillators 264, 265 and 267, each of which provide tone of different frequency. While only a few types of signals and beams have been described in detail I do not wish to be limited to the signals discussed as I have shown the method by which any number and variety of signals, beams or direction finding appurtenances may be automatically provided by my controller.

Alternative drive for signal controller

Figure 25:
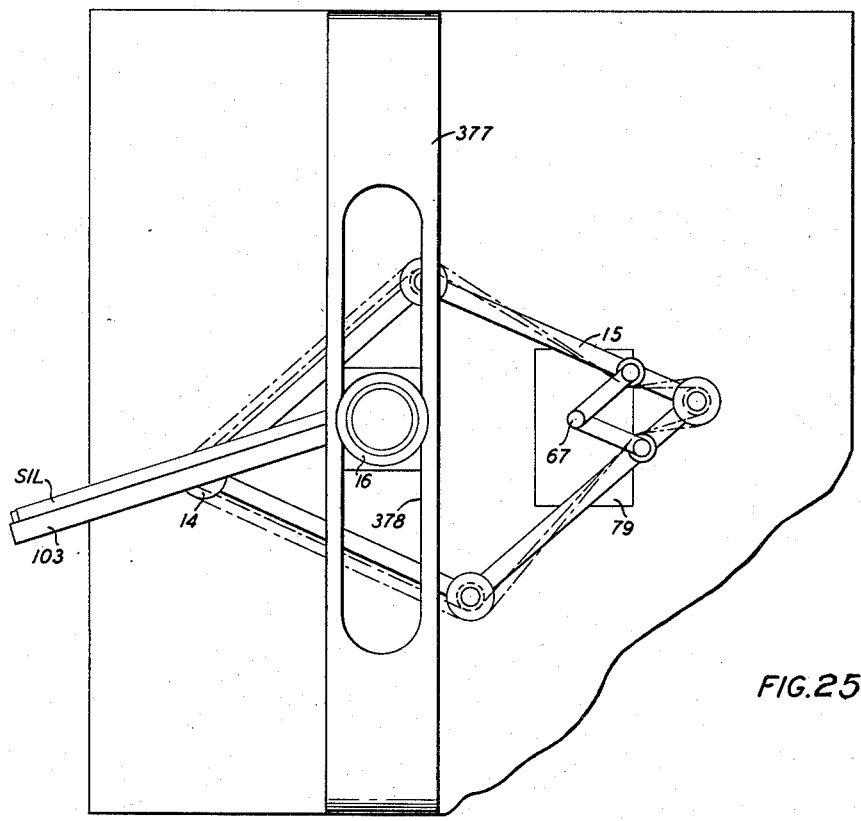
Fig. 25 is a plan view of the traversing table showing an alternate use of the controller Fig. 8.
Figure 26:
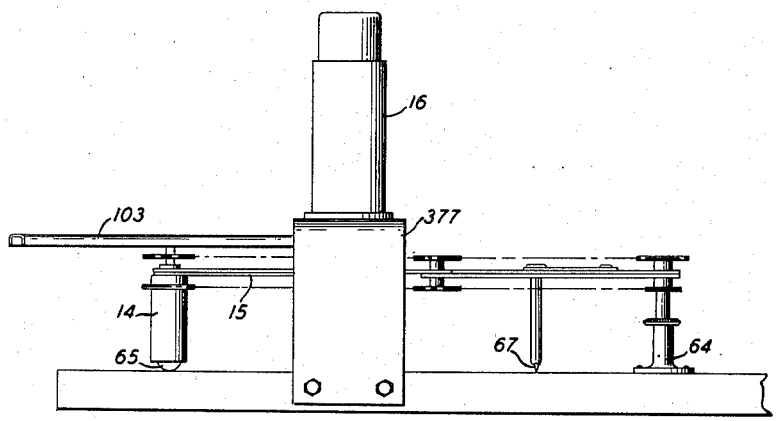
Fig. 26 is an elevation view of Fig. 30.

It is obvious, of course, that instead of using the pantograph 15 Fig. 1 as an intermediate link for connecting controller 16 to course charting head 14, the controller may be directly operated from course charting head 14 as shown in Figs. 25 and 26 or it may be operated from any other type of recording device, the movement of which represents the movement of an airplane over a radio range system. To operate the signal controller 16, Figs. 8 and 9, it is only necessary to connect pin 29' of slider 105 to a point on a course plotter or recorder which moves in correspondence with the airplane. In Figs. 25 and 26, 377 is a bracket for holding the signal controller 16 and 378 is a slot in which controller 16 may be displaced to simulate the effects of wind drift. A chart recording pencil is shown at 67 for tracing the path of the flight on map 79.

Plurality of signal controllers

Frequently it is desirable to practice orientation with respect to two or more radio transmitters or radio range stations. This requires that the signals emanating from both locations be varied in accordance to the position of the course charting head 14, Figs. 1 and 25, as it moves over the traversing table 8. To provide for the automatic variation of all signals, beams and radio compass bearings, I have devised a method and means whereby a plurality of controllers may be operated simultaneously. Fig. 2 shows the principal controller at 16 and its radio compass operating shaft at 206. Yoke 285 attaches to controller 16 and may be rotated about said controller and clamped at any desired azimuth angle, said angle being read at index 286 on compass dial 112 Figs. 2 and 8. This orientation of yoke 285 with respect to controller 16 corresponds to the bearing from controller 16 to a second controller 16' mounted in an inverted position on the guide rails 288 of yoke 285. The arm 103', Fig. 1, of controller 16' is somewhat longer than arm 103 of the principal controller 16 inasmuch as the orientation problem is worked around controller 16 thereby utilizing the entire area swept by arm 103 whereas the principal motion of pin 29' in arm 103' will have been radial. A compass dial 112' Fig. 2 is also provided on controller 16' so that its beams may be oriented with respect to yoke 285 and thereby with respect to controller 16. In all signal controlling operations, controller 16' functions in the same manner as controller 16, the arms 103 and 103' of both being operated conjointly by pin 29' of pantograph 15. The compass operating shaft 206' of controller 16' corresponds to shaft 206 of the lower controller 16. In order that shaft 206' may be operated from dashboard 7, shaft 206' has been extended to the unity ratio bevel gears 290 and 291 which are mounted axially directly over the center of the lower controller 16. Bevel gear 291 is driven by bevel gear 292 which meshes with 293 and in turn is driven by shaft 294. As may be seen by reference to Fig. 2, if shaft 294 is prevented from turning while yoke 285 is swung in azimuth, bevel gears 283, 292 and 291 will remain stationary, whereas gear 290 and therefore shaft 206' will rotate the same amount that yoke 285 is swung. Since shaft 206' drives a pair of bevel gears in controller 16' similar to gears 205 and 204, Fig. 8, the compass balancing slider 203 of the compass potentiometer 202 in controller 16', which are similar to those of controller 16, will show the new and correct bearing from pin 29' to the center of controller 16' thereby showing the bearing from the airplane to radio station No. 2 simulated by controller 16'.

In order that the bearing of the airplane may be read to either station, namely, No. 1 or No. 2, represented respectively by controllers 16 and 16', a switch 295, Fig. 20, operated by rotation of dial 296, Fig. 3, is provided for switching the receiver and the galvanometer from one potentiometer 202 of one controller to the other. The operation of switch 295 can be shifted to occur at any location on dial 296, so as to make said operation take place when the dial is turned to the transmitting frequency of the simulated station. The turning of dial 296 to operate switch 295 simulates the tuning of a radio compass receiver from one station to another. In like manner switch 297, Fig. 18, is operated by dial 298, Fig. 3, to switch the interrupter and receiving circuits bracketed at A, Fig. 18, from the No. 1 controller 16 shown in Fig. 18 to the No. 2 controller 16' by switching the incoming leads shown at bracket B.

When simulating a radio compass or a radio direction finder, it is convenient that the sliders 203 Fig. 8 of both controllers operate conjointly, the position of each slider with respect to its potentiometer being independently determined by operation of the selective switch 295, Fig. 20. As described above, in simulating a radio compass equipped airplane where the entire plane must be turned to orient the compass, the sliders 203 of both controllers may be driven by the steering motor shaft 61, Figs. 1 and 23, which rotates in correspondence with the change in direction of the course charting head 14 Fig. 1 and therefore the airplane. The method of driving the shaft 206 Fig. 8 and hence slider 203 of the lower controller, by pulling out control 302 Figs. 3 and 23 and engaging clutch 319 Fig. 23, has already been described in detail above. Clutch 319 operated, causes shaft 61 to drive gear 320 Fig. 23 and thereby gear 321 and hence shaft 307 and gear 322 which in turn drives gear 323 causing gear 324 to drive gear 325 which is attached to shaft 294. Shaft 294, Fig. 2, drives gears 293, 292, 291 and 290 to drive shaft 206' and thereby gears 205 and 204 of the upper controller. Gear 204 rotates slider 203 Fig. 8. It is to be noted that pulling out control 302 Fig. 3 has operated bar 326 Fig. 23 by the action of cam 327, said operation releasing clutch 309 which disengages gear 340 from shaft 307 and thereby prevents inadvertent damage to the mechanism should handwheel 328 be turned against the effort of the steering motor SM to drive the system. The compass 300, however, continues to be driven by the gears 315 and 316 from shaft 307 which is continuous through clutch 309. Any effort to actuate controls 301 or 303 results in restoration of control 302 through operation of links 343 or 344, respectively. This interlock is provided to prevent engagement of controller pins 227, Fig. 8, while slider 203 is driven by the steering motor SM.

When it is desired that the system simulate a radio direction finder, the controls 301, 302 and 303 are left in their normal position as shown in Fig. 23. Clutch 319 is disengaged due to rack 310 having rotated gear 317 and levers 318 to the retractive position. However, clutch 309 is engaged due to cams 337, 327 and 338 being normal. Hence, handwheel 328 may be turned to rotate sliders 203 in both controllers, the selection dial 296, Fig. 3, being turned to connect indicator 221, Fig. 20, and receiver 222, Fig. 21, to the radio station on which the bearing is to be taken. Handwheel 328 rotates gear 339 and thereby gear 340 which turns shaft tube 341 and clutch 309 to rotate shaft 307 and thereby gears 322, 323, 324 and 325. Gear 325 drives shaft 294, Fig. 2, which turns gears 293, 292, 291 and 290 Fig 2 to turn shaft 206' and controller gears 205 and 204 Fig. 8 which later turns slider 203. Shaft 307 Fig. 23 also turns gear 306 through differential assembly 308 and thereby shaft 206 which drives gears 205 and 204 Fig. 8 of the lower controller and hence slider 203 of that controller. Shaft 307 Fig. 23 also drives gears 315 and 316 and thereby compass dial 300 on which the orientation of sliders 203 may be read. As explained above, the position of the sliders 203 and therefore compass 300, when the galvanometer 221 or receiver 222 indicates a null point, is the bearing or cobearing to which the trainer should be "flown" to reach the station.

If it is desired to obtain continual and automatic indication of the direction of the airplane from the radio station, lever 301 or 303 is pulled out, depending respectively on whether the direction is desired to the station simulated by the upper controller, or the station simulated by the lower controller. Assuming control 301 actuated, cam 338 lowers lever 341 to disengage clutch 309. Control 301 operates bar 342, Figs. 23 and 2, to pull cord 613 by differential rack 614 Fig. 1 and thereby rotate sector 615 which operates shaft 225, Figs. 8 and 16, to cause pin 227, Fig. 8 of the upper controller to lock collar 226 to gear 204 which is then driven by shaft 162 of the upper controller by movement of arm 163' Fig. 1. Gear 204 Fig. 8 drives gear 205, shaft 206' and shaft 294 Fig. 23 through gears 290, 291, 292 and 293, Fig. 2. Shaft 294 drives gears 325, 324, 323 and 322 Fig. 23 and thereby shaft 307 which turns gears 315 and 316 and thereby compass dial 300, to show the direction of the airplane to the station. The operation with control 303 pulled out, has been described previously in this specification. Controls 301 and 303 cannot simultaneously be actuated as operation of either one restores the other through link 329.

*Wind drift*

To introduce the effect of wind drift, the lower controller 16, Figs. 1 and 2, the yoke 285 and thereby also the upper controller 16', are displaced conjointly by wind drift motor WDM, 180, Fig. 2, which also simultaneously displaces map 79, Fig 1, at the proper speed and in the correct direction.

In Figs. 23 and 3, the rate of climb meter 3 is driven by the altimeter motor ALTM. The ALTM motor also drives the vertical element of the artificial horizon. The rate of turn meter 2, Fig. 23, is driven by the steering motor SM. Shaft 61 is driven from motor SM through the reduction gearing 332. The gyrocompass 5 and the magnetic compass 600, Figs. 23 and 3, are driven from the steering shaft 61 through miter gears 333 and 334, the differential gear assembly 335 and miter gears 336.

Wind drift direction

The orientation of the entire charting surface 8, Fig. 1, is dependent on the orientation of the signal controller 16. That is, rotating the controller in its support 115 or in the table guide 17, Fig. 1, is the equivalent of proportionately shifting the North direction on the plotting table. Hence, although the controller may only be moved in the direction of the guide 17, Fig. 1, wind drift may be introduced in any direction by simply rotating the lower controller 16 in the guide 17 as by rotating the body of controller 16 in the slide 115, Fig. 8. Inasmuch as the lower controller carries yoke 285 the upper controller will simultaneously be turned in azimuth as the lower controller is turned. It will be clear, that to avoid errors in the indication of the compasses 5, 300 and 680 Fig. 23 it is necessary that the cards of these compasses be rotated conjointly with the controller bodies and yet allow rotation to be superimposed from the operation of the steering shaft 61, the handwheel 328, or the shafts 206 and 294 as the case may be. This is accomplished by the differential gear assemblies 308 and 335. Bevel gear 346, Figs. 8 and 2, encircling the lower controller 16 rotates gear 347, Fig. 2, as the orientation of the controller 16 is altered. Gear 347 rotates shaft 348 and gears 349 and 350 Fig. 23, and shaft 351. Shaft 351 turns gear 352, idler 353 and gear 354, the latter turning the frame of differential assembly 308 and thereby differential gear 355 and gear 356 which turns shaft 307 and thereby displaces compass dial 300 by an equivalent amount. When the body of controller 16 is locked, gear 354 and therefore frame 308 are locked thereby causing any rotation of gear 306 to be transmitted to shaft 307 without loss of motion. Similarly shaft 351 rotated by shaft 348 causes gear 379 to turn gear 380 and thereby the differential frame 335 to which gear 380 is attached. Rotation of frame 335 causes gear 381 to turn gear 382 and thereby shaft 383, gears 336 and the card 299, Fig. 3, of compass 5. Likewise rotation of shaft 383 by differential 335 causes rotation of bevel gears 693, shaft 692 and gears 691 causing corrective displacement of magnet 689 in compass 680, Fig. 27. By means of the differential gear assembly 335, the compasses 5 and 680 are automatically reset to compensate for any change in orientation of the north reference direction on the course traversing surface due to rotation of the controller body. With shaft 351 held fixed by locking the body of controller 16 in fixed orientation, gears 379 and 380 prevent movement of differential frame 335 and any rotation of shaft 384 is transmitted to shaft 383 without ratio change.

From the foregoing description it will be apparent that the mechanism of Fig. 23 is of a universal nature in that it permits a plurality of controllers equipped with radio compass simulating means to be instantly converted for operation from a radio direction finder to a radio compass or to an automatic direction indicator. Moreover the mechanism in addition automatically shifts all compass cards by an amount necessary to compensate for the rotation of the north reference point with rotation of the controllers. Obviously, of course, it is not necessary that the mechanism of Fig. 23 be used in its entirety, it being only necessary to employ those components which relate to the functions to be performed.

It is to be clearly understood that the Selsyn motor adaptation previously described and shown in Fig. 24 is an alternative means to the mechanism shown in Fig. 23 which mechanism in combination with the gearing and potentiometer 202 of the signal controller of Fig. 8 provides means for selectively simulating a radio compass, a radio direction finder or an automatic radio direction indicator for taking bearings to a selected one of a plurality of simulated radio transmitting stations.

Alternative wind drift means

Instead of introducing the effect of wind drift by translating the controller 16 and map 79, Fig. 1, the alternative procedure may be employed of moving the surface on which the course charting head 15 traverses, said movement being with respect to controller 16, map 79 and pantograph support 64. The traversing surface to be moved may be a continuous loop of flexible material such as cloth or paper, 585 Fig. 1 revolved by a conventional motor drive (not shown) at any desired speed to represent a given wind velocity.

Magnetic compass

Figure 29:
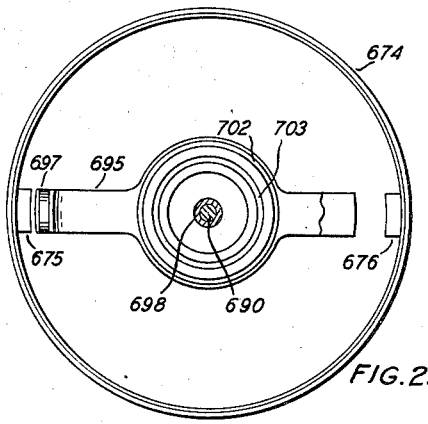
Fig. 29 is a partial sectional view of the magnetic compass.
Figure 27:
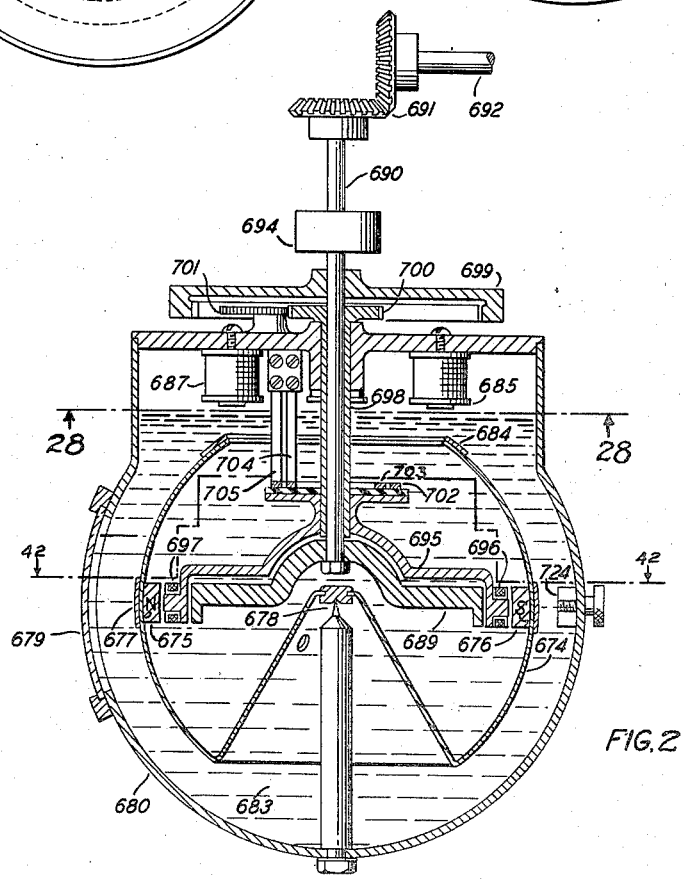
Fig. 27 is a detail sectional view of the magnetic compass.

In an actual airplane during turning and other maneuvers a magnetic compass element is subjected to various forces which cause the element to rotate and swing in a characteristic manner. This behaviour of a magnetic compass is simulated in my trainer as follows:

Referring to Fig. 27, a spherical magnetic compass element 674 having pole magnets 675 and 676 respectively and an azimuth card 677, is supported on pivot 678 in casing 680 having a window 679 and containing damping fluid 683. Mounted within the compass is a permanent magnet 689 attached to a shaft 690 which is rotated by gears 691 driven by shaft 692. Referring to Fig. 23, shaft 692 is operated by bevel gears 693 from shaft 383 which, as previously described, rotates in accordance with the heading of the course charting device 14, Figs. 1 and 2. The shaft 383 is also responsive to rotation of the signal controller 16, Figs. 1 and 2 in the manner already described to correct the compass indication for changes in the north reference direction produced by rotating the controller 16 with respect to the traversing table 8, Fig. 1. Provision is made at the adjustable coupling 694, Fig. 27, for displacing the magnet 689 from its true angular orientation with respect to the north reference direction to simulate any desired magnetic variation. It will be clear that any rotation of the magnet 689 by shaft 690 will cause the compass card 674 to seek the new position of the actuating magnet 689. Also operated by the shaft 690 is the internal gear 699 which drives gear 700 at increased angular velocity through idler 701. Attached to gear 700 is a sleeve 698 which carries the nonmagnetic yoke 695 and the series connected solenoid coils 696 and 697, Figs. 27 and 30. These coils are terminated in slip rings 702 and 703, Figs. 27 and 29 and are energized in proportion to current flowing in the steering motor SM, Fig. 5, the power being transmitted through the brushes 704 and 705 over the correspondingly numbered wires of Fig. 5. Inasmuch as shaft 690 rotates sleeve 698 and the yoke carrying the coils 696 and 697 whenever the steering motor SM is in operation and since these coils are energized in proportion to the speed of the motor SM, and additionally since they revolve more rapidly than the magnet 689 which follows the movement of the course charting device, arbitrary forces are established which produce a spinning effect on the compass element simulating the effects of north turning error and other reactions of an actual compass during turns. When power to the steering motor is cut off and a straight "course" has been resumed, the coils 696 and 697 receive no current and the compass element 674 again seeks the orientation of the magnet 689.

It is to be noted that it is possible to obtain a satisfactory simulation of north turning error with only one coil such as 697, Fig. 27, and this coil may be stationary. That is, coil 697 may be used independently of coil 696 and may be permanently mounted from a fixed yoke and in line with the N pole magnet 675 when the compass element 674 is directed to the north. Then if coil 697 is so polarized that current from Fig. 5 energizes the coil to attract the north seeking magnet 675 when the steering motor SM is operating, the movement of the compass element 674 will simulate the motion of a magnetic compass while in an appreciably banked turn.

Figure 30:
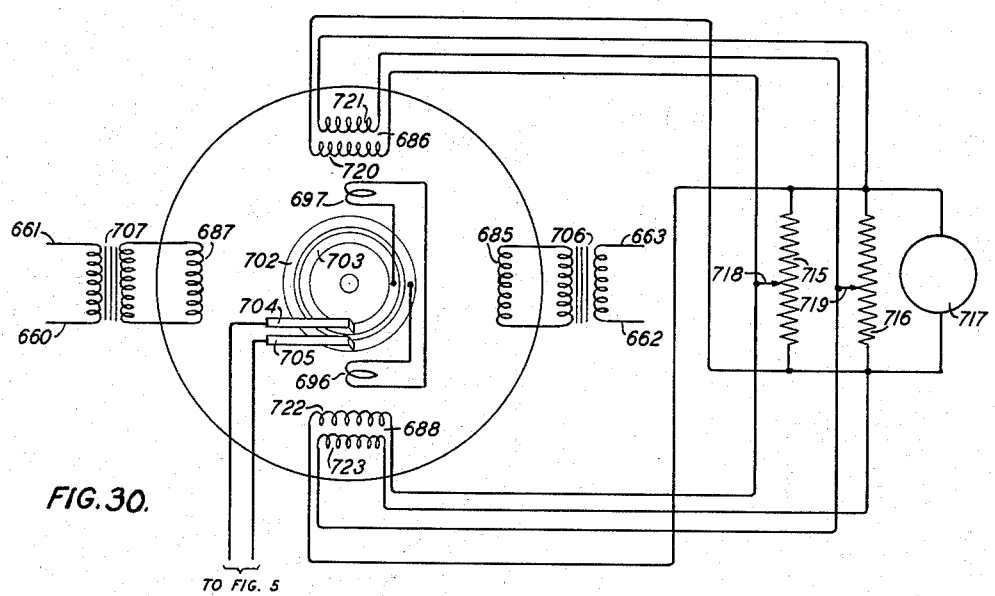
Fig. 30 is a schematic circuit for the magnetic compass.
Figure 28:
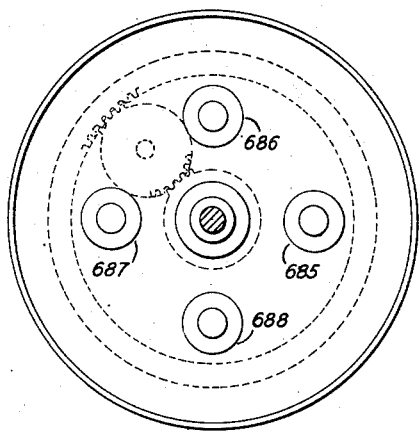
Fig. 28 is a top plan view of the magnetic compass.

To add further realism to movement of the compass element 674, a magnetically permeable ring 684 has been attached to the upper segment of the element. Four solenoids 685, 686, 687 and 688 are symmetrically disposed around the ring 684, Fig. 28. The solenoids 685 and 687 are responsive to the altimeter motor circuit Fig. 6, and are connected respectively through transformers 706 and 707, Fig. 30, into the plate circuits of thyratron tubes 708 and 709, Fig. 6. When thyratron 709 ignites to operate the ALTM motor in the direction of increasing altitude, solenoid 687 is energized and attracts ring 684 causing the compass element 674 to tip upwardly in the manner of an actual magnetic compass during climbs. Likewise, if the tube 708, Fig. 6 is conducting, the motor ALTM operates in the direction of decreasing altitude, solenoid 685, Fig. 30, is energized and acts on ring 684 to tilt the compass element 674 to show a diving attitude. Transformers 706 and 707 are used for coupling the solenoids 685 and 687 to the thyratron circuits to convert the pulsating direct current in the output circuit of the tubes to alternating current so that flux from the solenoids will be of alternating polarity and therefore will not react with the pole magnets 675 and 676 to cause extraneous rotation of the compass element 674 in azimuth.

It is another characteristic of a magnetic compass in an airplane that the pivotal axis of the compass card remains parallel to a plane through the longitudinal and vertical axis of the airplane when the airplane is properly banked during turns. When there is slipping or skidding, the compass card axis swings laterally in accordance with the resultant forces. This action is simulated in the compass shown in Figs. 27 and 28 by suitably energizing the solenoids 686 and 688. These solenoids each contain two windings which are connected to rudder operated potentiometer 715 and aileron operated potentiometer 716 as shown in Figs. 30, 1 and 2. The potentiometers are energized by the alternating current power source 717, Fig. 30. Alternating current is employed for energizing the solenoids 686 and 688 for the reason already stated in connection with the solenoids 685 and 687.

The operation of these deflecting solenoids is as follows: When the rudder 11 and the aileron control 10, Figs. 1 and 2, are in the neutral position, sliders 718 and 719 of the rudder and aileron potentiometers 715 and 716, Fig. 30, are centrally disposed and equal voltages will be applied to windings 720, 721, 722 and 723 of solenoids 686 and 688, Fig. 30 thereby producing equal forces of magnetic attraction on ring 684 and holding the compass element 674 in normal position. If the sliders 718 and 719 are both displaced to the right or left of the central position by proportional amounts it will be seen that the total flux from both coils of each of the solenoids 686 and 688 will be equal and the ring 684 will remain in equilibrium. This proportionate deflection of both the rudder and aileron controls in like direction corresponds to coordinated control movement which produces a smooth turn in an airplane without slipping or skids. If excess aileron is applied, as for example to the right, slider 719 will increase the voltage across coil 723 and simultaneously reduce the voltage on coil 721 by a greater amount than the flux in coil 720 is in excess over the flux in 722 and there will therefore be a net attractive force at solenoid 688 to tilt the left edge of the compass element upward indicating a slip in the right turn. Excessive right rudder will increase the voltage from slider 718 on coil 720 and decrease it on coil 722 thereby causing the right edge of the compass card to tilt upward indicating a skid. Opposite deflections of the aileron and rudder cause increased disparity between the flux in solenoids 686 and 688 and increased tilting of ring 684 and compass element 674 in accordance with the direction and severity of the skid. Iron masses such as 724, Fig. 27, may be adjustably disposed around the compass to cause deviation of the compass element.

The simulated magnetic compass described above is responsive to the rough air circuit, Fig. 7 because the current to the deflecting coils 685 and 687 is modified by the current from Fig. 6 which is connected to Fig. 7. Similarly current to the spin coils 696 and 697 is received from Fig. 5 which is responsive to Fig. 7.

*Artificial horizon*

In an airplane it is customary to install an instrument known as an artificial horizon which is gyroscopically operated to indicate the attitude of the airplane with respect to the natural horizon. In my trainer I have simulated an artificial horizon instrument by the following means.

Figure 4:
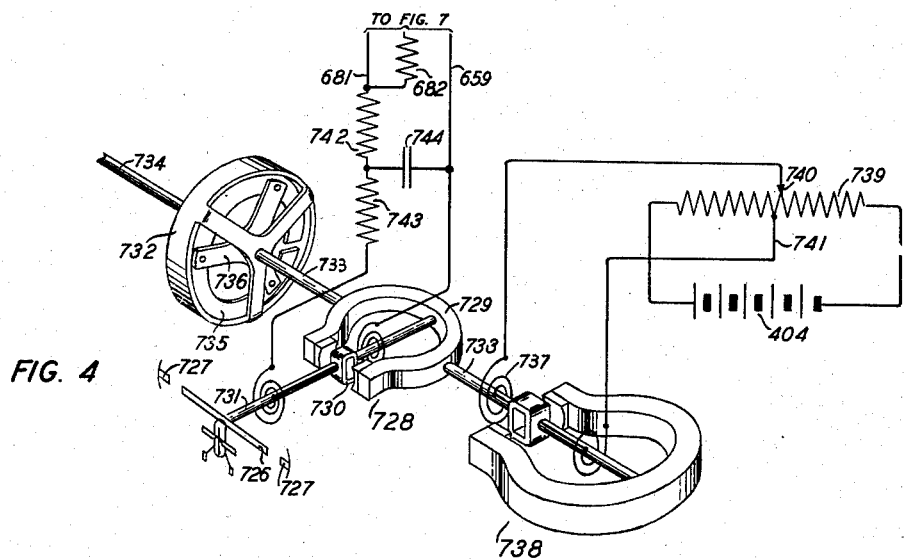
Fig. 4 is a diagrammatic perspective view and wiring of the artificial horizon.

Instrument 725, Figs. 3 and 23, is the artificial horizon consisting of a marker 726, Fig. 4, which is movable with respect to the horizon indices 727 to indicate the attitude of the airplane with respect to the natural horizon. Marker 726 is deflected by galvanometer 728 to show banking. The galvanometer 728 consists of a permanent magnet 729, a moving coil 730 energized by the aileron potentiometer 508, Figs. 1 and 7, over leads 659 and 681. The resistors 742 and 743 in combination with condenser 744 produce time delay to the response of galvanometer 728 in the well known manner. The coil 730 is so polarized with respect to the magnet 729 that banking to the right causes the galvanometer shaft 731 to rotate clockwise. Connection 682 renders the galvanometer 728 responsive to the rough air circuit of Fig. 7 to randomly deflect the marker 726 in simulation of rough air conditions the operation of Fig. 7 being as previously described.

Upward and downward deflection of marker 726 to indicate longitudinal changes of the airplane with respect to the natural horizon is accomplished by a well known eddy current type of drive consisting of a speed cup 732 attached to shaft 733 to which is fixed the galvanometer 728. Shaft 734 is driven by the altimeter motor ALTM, Fig. 23, through the gearing 780 and accordingly is rotated at the speed and direction corresponding to the climbing or diving rate as determined by movement of the throttle, elevator-aileron and/or stabilizer controls shown respectively as elements 13, 10 and 440, Fig. 2. Shaft 734 drives the magnet 735, Fig. 4, through spider 736. Rotation of magnet 735 within the speed cup 732 induces eddy currents in cup 732 and causes the cup to deflect and raise or lower the marker 726 against the restraining torque of spring 737. Inasmuch as the altimeter motor ALTM is responsive to the rough air circuit, Fig. 7, the marker 726 also will be deflected vertically in a manner corresponding to the movement of an artificial horizon in an airplane during flight in rough air.

The galvanometer 738 is similar to galvanometer 728 except that it is of heavier construction and is responsive to the elevator potentiometer 739, Figs. 4 and 1. As the elevator operated slider 740 is deflected to the right or left by forward or back movement of elevator control 10, galvanometer 738 exerts a torque to rotate galvanometer 728 about the axis of shaft 733 and this torque is superimposed on the torque produced at the speed cup 732. The supplementary torque thereby provided is desirable to permit, for example, holding the marker 726 at an even keel or at a "nose up" position when the throttle, 13, is closed and the altimeter motor is operating in the loss of altitude direction. By connecting lead 741 to either side of the neutral elevator position of slider 740 and by contouring the resistance card of potentiometer 739, galvanometer 738 may be caused to produce substantially any desired modification to the torque of speed cup 732.

The foregoing text has described the various flight conditions which are simulated by means according to my invention. Some of these flight conditions are speed, altitude, movement, acceleration, direction of flight, position with respect to a reference object, radio orientation, skid, slip, icing, and wind drift.

Having thus described my invention with particularity with reference to its preferred form, and having illustrated various modifications thereof, it will be obvious to those skilled in the art, after understanding my invention, that other changes and modifications may be made therein without departing from the spirit and scope of my invention, and I aim in the appended claims to cover such changes and modifications as are within the scope of the invention.

I claim:

1. Flight-simulating apparatus for indicating and controlling one or more flight conditions comprising controls for the said one or more conditions, a motor, a flight-indicating instrument operated by the motor, a thermionic valve stage having two input and two output circuits, the output circuits being connected in push-pull, a source of current having alternating components for energizing the thermionic valve stage, means for variably unbalancing the input circuit in accordance with movements of said controls and means responsive to the unbalanced alternating components in the output circuit for controlling the operation of the motor.

2. Flight-simulating apparatus for indicating and controlling one or more flight conditions comprising controls for the said one or more conditions, a thermionic valve circuit responsive to the controls, a motor operated by said thermionic valve circuit, a flight indicating instrument driven by said motor and means for changing the sensitivity of response of said thermionic valve circuit to said controls to simulate different responses of various types and sizes of aircraft to operation of their controls.

3. Flight-simulating apparatus for indicating and controlling one or more flight conditions comprising controls for the said one or more conditions, an electric circuit having a plurality of electrical circuit branches each provided with variable electrical means, said variable electrical means being responsive to said flight controls for deriving branch circuit voltages, thermionic valve means responsive to the resultant of said derived voltages, a flight-indicating instrument responsive to said thermionic valve means, electrical means for delaying the response of the instrument to the controls to cause the instrument to react to the operation of the controls in like manner to the operation of a similar instrument in an actual aircraft.

4. Apparatus for simulating the flight of an aircraft comprising aircraft controls, a thermionic valve circuit with means for rendering the circuit responsive to the controls, means for delaying the response of the circuit to the controls, a motor operated by the circuit and an operating station moved by the motor at a rate and in a direction corresponding to the simulated flight.

5. Apparatus according to claim 84, in which the means for rendering the circuit responsive to the controls comprises potentiometers operated by the controls and in which the means for delaying the response comprises a condenser and a resistance interposed between the potentiometers and the thermionic valve circuit.

6. Flight simulating apparatus for indicating and controlling one or more flight conditions including aileron and rudder controls for the said one or more conditions, a thermionic valve circuit responsive to the controls, electrical means for delaying the response of the circuit to the controls, a flight indicating instrument responsive to the circuit and means for decreasing the delay in accordance with the degree of opposite aileron and rudder application.

7. Apparatus for simulating the flight of an aircraft comprising aircraft controls, a motor, an operating station moved by the motor according to the direction of the flight, a thermionic valve stage having two input and two output circuits, the output circuits being connected in push-pull, a source of current having alternating components for energizing the thermionic valve stage, means for variably unbalancing the input circuit in accordance with movements of the flight controls and means responsive to the unbalanced alternating components in the output circuit for controlling the operation of the motor.

8. In flight-simulating apparatus a control circuit, comprising two thermionic valves each having a grid, a cathode and a plate, a source of plate current and an output circuit connecting the plates to the source in push-pull relation, a controlled device connected to the output circuit, a source of alternating current for heating the cathodes, a source of variable control voltage for each tube and a conductive path for each tube extending from the grid to the cathode through the source of control voltage and the source of alternating current.

9. Flight-simulating apparatus having flight controls, a source of voltage, electrical circuit connected to said source and having a plurality of electrical circuit branches each provided with a potentiometer, said potentiometers being operable by said flight controls for deriving branch circuit voltages varying with the adjustment of said controls, thermionic valve means responsive to the combination of said derived voltages, motor means responsive as to direction and speed to the thermionic valve means and a charting device responsive to the motor for indicating flight movements.

10. Aircraft training apparatus for conducting a simulated flight, comprising a source of radio range signals, flight controls, a source of voltage, an electrical circuit connected to said source and having a plurality of electrical circuit branches each provided with a potentiometer, said potentiometers being operable by respective of said controls for deriving branch circuit voltages varying with the adjustment of said controls, thermionic valve means responsive to the combination of said derived voltages, motor means responsive as to direction and speed to the said thermionic valve means, signal controlling means for varying the said radio range signals and means for operatively connecting the signal controlling means to the motor, means to cause the signals to vary in accordance with the simulated flight.

11. Apparatus according to claim 10, in which the means for operating the signal controlling means comprises a course indicating device.

12. Flight-simulating apparatus according to claim 10, in which the means for operating the controlling means comprises a course charting device and a pantograph.

13. Electrically powered flight-simulating apparatus for indicating and controlling one or more flight conditions, comprising controls for the said one or more conditions, an electrical circuit having a plurality of electrical circuit branches each provided with variable electrical means, said variable electrical means being responsive to said flight controls for deriving branch circuit voltages, thermionic valve means responsive to the resultant of said derived voltages, a motor operated by the thermionic valve means, a flight indicating instrument responsive to the motor and electrical means for intermittently causing the motor to deflect the indicator to simulate behavior in rough air, said flight controls being adjustable to restore said deflections to normal.

14. Apparatus according to claim 13, in which the electrical means comprises a voltage source and means for randomly applying voltage from said voltage source to the thermionic valve means.

15. Apparatus according to claim 13, in which the thermionic valve means has a normally balanced output circuit and in which the circuit is unbalanced in opposite directions in irregular sequence to produce opposite rotation of the motor and thereby opposite deflections of the indicator.

16. Emplaced flight-simulating apparatus comprising flight controls, an electrical circuit having a plurality of electrical circuit branches each provided with variable electrical means, said variable electrical means being responsive to said flight controls for deriving branch circuit voltages, thermionic valve means responsive to the resultant of said derived voltages, a motor responsive to said thermionic valve means, a flight indicating instrument operated by the motor and electrical means whereby the rotation of the motor may intermittently be varied to cause variations in the deflection of the flight indicating instrument to resemble rough air conditions encountered in actual flight.

17. Flight-simulating apparatus according to claim 16, in which the rotation varying means comprises power driven contacts, resistance units and connections between the contacts, the resistance units and the motor whereby operation of the contacts changes the current through said motor.

18. Flight-simulating apparatus according to claim 86, in which the member also drives a controller for varying signals adapted to represent radio range signals, the controller being rotatably adjustable with respect to the member to change the north reference on the charting surface and in which the means driven by the member includes a Selsyn type drive whereby the north position of the indicating element remains fixed in direction regardless of the rotary adjustment of the controller.

19. An emplaced apparatus adapted to simulate the flight of an aircraft with respect to a plurality of radio stations, said apparatus comprising a charting surface, a charting device adapted to be moved with respect to the surface to simulate a flight course, a plurality of members each having an axis adapted to represent the location of a radio range station, means associated with each member for rotating said member in accordance with the motion of the charting device, a direction indicating element simulating an automatic radio direction indicator as used on an actual aircraft, and means for selectively connecting the indicating element to any one of said plurality of members to produce a continuous indication of the bearing of the charting device with respect to the axis of the selected member to simulate the action of an automatic radio direction indicator when tuned to a selected radio station.

20. Apparatus adapted to simulate the flight of an aircraft with respect to a plurality of radio stations, said apparatus comprising a charting surface, a charting device adapted to be moved with respect to the surface to simulate a flight course, a plurality of members each having an axis representing the location of a radio range station, one of the members being bodily movable with respect to the other, an element attached to each member for rotating the member, a driving member common to the elements, a pantographic connection between the charting device and the common driving member, and means selectively connectable to any one of the shafts for operating a simulated device for determining direction by radio.

21. Apparatus adapted to simulate the flight of an aircraft with respect to a radio station, said apparatus comprising a traversing surface, a course charting device adapted to be moved with respect to the surface to simulate a flight course, a rotatable member having an axis of rotation coincident with a simulated radio transmitting station with respect to which the course charting device may be moved, an electrical circuit and a galvanometer responsive thereto, means adapted to simulate the orientation element of a radio direction finder, the movement of the simulating means causing the electrical circuit to modify the current to the galvanometer and an operative connection between the rotatable member for additionally modifying the course charting device and the electrical circuit whereby the circuit is caused to produce current flow for deflecting said galvanometer from a reference index except when said orientation simulating means is moved to a position corresponding to the bearing or co-bearing between said course charting device and said simulated radio transmitting station.

22. Apparatus adapted to simulate the flight of an aircraft with respect to a radio station, said apparatus comprising a charting surface, a charting device adapted to be moved with respect to the surface to simulate a flight course, a shaft having an axis representing the location of a radio station, means operably connected to the charting device for rotating the shaft in accordance with the change in bearing of the charting device with respect to the station, an energized electrical circuit comprising as components a resistance loop element and a source of power connected to the loop element at substantially diametrically opposite points, a conductive element contacting the loop, an indicator connected between one of the components and the conductive element, and manually operable means adapted to simulate the orientation unit of a radio direction finder on an aircraft and including a compass card and reference mark, one of the elements being driven by the shaft and the other element being driven by the manually operable means.

23. Apparatus for simulating the flight of an aircraft with respect to a radio station, said apparatus comprising a traversing surface, a course charting device operating with respect to the surface and adapted to be operated by a pupil, a simulated radio transmitting station with respect to which the course charting device may be traversed, an electrical circuit with an indicator responsive thereto, means adapted to simulate the orientation element of a radio direction finder and to modify the current to said indicator with respect to a reference value and an operative connection between the course charting device and the electrical circuit whereby the circuit is caused to produce current flow in said indicator other than said reference value of current except when said orientation simulating means are moved to a position corresponding to the bearing or cobearing between the course charting device and said simulated radio transmitting station.

24. A simulated radio compass in apparatus for simulating the flight of an aircraft with respect to a radio station, said apparatus comprising a traversing surface, a course charting device adapted to be moved with respect to the surface to simulate a flight course, a simulated radio transmitting station with respect to which the course charting device may be moved, a member positioned to represent the location of a radio range station, means for rotating the member in accordance with the change in bearing of the charting device with respect to the station, an electrical network element, a source of power connected to the network element at substantially diametrically opposite points, an indicator connected to the network element by one fixed connection and one adjustable conducting element, an operative connection including a compass dial and reference mark, the operative connection continually moving one of the elements in accordance with the instantaneous traversement direction of the course charting device and the other element being moved in accordance with rotation of the member.

25. An emplaced apparatus for simulating the flight of an aircraft with respect to a plurality of radio stations, said apparatus comprising a traversing surface, a course indicating device adapted to be moved with respect to the surface, a plurality of simulated radio transmitting stations with respect to which said course indicating device may be traversed, a plurality of electrical circuits with means for selectively connecting each to a galvanometer responsive to said circuits, means simulating the orientation element of a radio direction finder, the movement of said orientation simulating means causing any selected one of said electrical circuits to modify the current to said galvanometer and an operative connection between said course indicating device and each of said electrical circuits whereby said selected electrical circuit will be caused to produce current flow in said galvanometer except when said orientation simulating means are moved to a position corresponding to the bearing or cobearing between said course indicating device and said selected radio transmitting station.

26. Apparatus for simulating the flight of an aircraft with respect to a radio station, said apparatus comprising a traversing surface, a course charting device adapted to be moved with respect to the surface, a simulated radio transmitting station with respect to which the course charting device may be traversed, a signal controller simulating radio signals transmitted from the station and determining the direction of north on the traversing surface, a direction indicator, an operative connection between the course charting device and the indicator and means responsive to rotation of the signal controller for changing the north direction on the traversing surface for correspondingly resetting the direction indicator.

27. Apparatus for simulating the flight of an aircraft with respect to a radio station, said apparatus comprising a traversing surface, a course charting device adapted to be moved with respect to the surface, a simulated radio transmitting station with respect to which the course charting device may be traversed, a signal operatively connected to the charting device for deriving signals adapted to simulate radio signals transmitted from an actual station, a receiver therefor, means for adjusting the signal controller for orienting the direction of north on the traversing surface, a direction indicator, an operative connection between the signal controller and the indicator and means responsive to adjustment of the signal controller for orienting the north direction on the traversing surface for correspondingly orienting the direction indicator.

28. Apparatus for simulating the flight of an aircraft with respect to a plurality of radio stations, said apparatus comprising a traversing surface, a course charting device adapted to be operated with respect to the surface by a pupil, a plurality of simulated radio range stations with respect to which said course charting device may be traversed, a source of radio range signals, a receiver therefor, means for each simulated station for attenuating the signals in accordance with the position of the course charting device with respect to the station, an operative connection between said course charting device and each attenuating means, and means for selectively connecting said receiver to any one of the attenuating means.

29. Apparatus for simulating the flight of an aircraft with respect to a radio glide beam station, said apparatus comprising a charting surface, a course charting device moving on the surface, the position of said device representing the position of an aircraft with respect to the radio station; flight controls adjustable to control the simulated movement of the aircraft, motive means responsive to the flight controls for operating the device, a movable element responsive to flight controls and moving in accordance with changes in the altitude of the aircraft above the radio station, means operatively connected conjointly to the movable element and the course charting device for simulating a radio glide beam and an indicator for showing the instantaneous position of the aircraft with respect to the glide beam.

30. Apparatus for simulating the flight of an aircraft with respect to a radio glide beam station, said apparatus comprising a charting surface, a course charting device operable on the surface, the position of said device representing the position of an aircraft with respect to the radio station located at a given altitude, flight controls operated by a pupil, motive means responsive to the flight controls for operating the device, an altimeter responsive to the flight controls, means operatively connected conjointly to the altimeter and the course charting device for simulating a radio glide beam, and an indicator for showing the instantaneous position of the aircraft with respect to the glide beam, said indicator being energized by the sum of two voltage components, one of the components varying with the altimeter reading above the radio station altitude and the other component varying with the distance between the charting device and the simulated point of origin of the glide beam.

31. Apparatus according to claim 30, in which the two component voltages are derived from two potentiometers connected to a source of voltage, one potentiometer being operated in accordance with the altimeter reading, the other by the charting device to maintain a reference voltage on the indicator when the flight controls are operated to follow the simulated glide beam and to vary the voltage with respect to the reference voltage when the aircraft is above or below the glide beam.

32. Apparatus adapted to simulate the flight of an aircraft with respect to a radio localizer beam station, said apparatus comprising a charting surface, a course charting device the movement of which is adapted to represent the movement of an aircraft with respect to a radio localizer beam station, said movement being controllable by an operator of the apparatus, means adapted to simulate a localizer beam with respect to which the course charting device may traverse, said means comprising a potentiometer circuit, an indicator responsive thereto and means including a rotatable member having its axis of rotation fixed with respect to said beam station and being operatively connected to said charting device for rotation thereby in accordance with the change in bearing of said charting devices with respect to said axis, whereby the potentiometer circuit is operated by the course charting device to control the indicator.

33. Apparatus according to claim 29 in combination with means for simulating a localizer beam comprising a potentiometer circuit operatively connected to the course charting device, the indicator being responsive conjointly to said glide and localizer beam simulating means.

34. Apparatus adapted to indicate and control simulated flight with respect to a radio station, said apparatus comprising a plurality of controls for the flight, an electrical circuit having a plurality of electrical circuit branches each provided with variable electrical means, said variable electrical means being responsive to said flight controls for deriving branch circuit voltages, a course charting device adapted to be operated by said thermionic valve means, the movement of the device representing the movement of an aircraft with respect to said radio station, a source of current, an indicating device, a circuit for connecting the source to the indicating device and means operated by the charting device for closing the circuit when the charting device is operated to simulate flight over a fan marker.

35. Apparatus adapted to simulate the flight of an aircraft with respect to a radio station comprising a traversing surface, a course charting device the traversement of which with respect to the surface represents the movement of the aircraft with respect to the radio station, a pantograph operated by the charting device, a signal controller operated by the pantograph, a map, a course marking stylus operatively connected to the charting device to mark the map and means for conjointly translating the signal controller and the map to simulate the effect of wind drift.

36. Flight-simulating apparatus for indicating and controlling one or more flight conditions comprising, a normally balanced electron tube circuit, an aircraft control for the said one or more conditions whereby the circuit may be adjustably unbalanced, an indicator operated in accordance with the direction and degree of unbalance of the circuit, and means in the circuit responsive to the movement of the aircraft control in one direction for progressively unbalancing the circuit in one direction and with continued movement of the control in the same direction progressively reducing and reversing the unbalance to cause the indicator to simulate the action of an aircraft instrument during a stall.

37. Apparatus according to claim 36, in combination with an electrical circuit operated by the control in stalling position for producing irregular deflections of the indicator to simulate the action of an instrument on an airplane while substantially stalled.

38. In aircraft flight-simulating apparatus for controlling one or more flight conditions, a throttle and an elevator control for the said one or more conditions, means for generating currents representing the sounds of an aircraft in flight, means conjointly responsive to the movement of the controls for varying the frequency and amplitude of the currents and a receiver actuated by the currents to reproduce sounds varying in accordance with the flight being simulated.

39. In aircraft flight-simulating apparatus for indicating and controlling a flight condition, controls for the condition, means for simulating a magnetic compass of an aircraft comprising a casing, a rotary magnetic compass element, means for pivotally supporting the element in the casing, a shaft rotated in accordance with the operation of the steering controls, a magnet simulating the earth's field mounted on the shaft in cooperative relation with the compass element, a ring of magnetically permeable material mounted on the compass element, two pairs of solenoids secured to the casing in operative relation to the ring, one pair of the solenoids being energized to tilt the compass element in response to movement of the controls to simulate diving or climbing of an airplane, and the other pair of solenoids being energized to tilt the compass element only when the controls are operated in such a manner as to simulate a flight condition causing an actual airplane to slip or skid.

40. In flight-simulating apparatus for indicating and controlling one or more flight conditions, the combination with an aileron control, a throttle and elevator and an electrical circuit conjointly responsive to the movements of the throttle and elevator, of means for simulating an artificial horizon instrument comprising a reference horizon line, an electro-mechanical device having a rotating element operated in accordance with the movements of the aileron control, an indicator attached to the element, electrical means responsive to the operation of the aileron control for energizing the device to rotate the indicator with respect to the horizon line to simulate banking attitudes and means responsive to the operation of said conjointly responsive electrical circuit for moving the device bodily to cause vertical displacement of the indicator.

41. Apparatus according to claim 39 in combination with means for causing abnormal rotation of the compass element during turns to simulate the "north turning error" of a magnetic compass in an actual aircraft.

42. Apparatus according to claim 86 in combination with a signal controller driven by the pivoted member for varying currents adapted to represent radio range signals, means for rotatably adjusting the controller with respect to the member to change the north reference direction on the traversing surface and means responsive to the rotary adjustment of the controller for retaining proper orientation of the direction indicating element.

43. Apparatus adapted to simulate the flight of an aircraft with respect to a radio station comprising a charting surface, a charting device adapted to be moved with respect to the surface in accordance with the course of the simulated flight, a pivoted member having its axis at a point representing the location of a radio range station, an operative connection between the device and said member to rotate said member in accordance with the change in bearing of the charting device with respect to the represented radio range station, a first Selsyn type motor driven by the member, a second Selsyn type motor comprising a fixed element and a rotary element, a polyphase winding on each motor, interconnections between windings, a compass card attached to one of the second motor elements and a reference mark attached to the other of the second motor elements, a single phase winding on the second motor, a meter having a reference deflection mark, and means for deflecting the meter to the mark when no voltage is induced in the single phase winding.

44. Apparatus adapted to simulate the flight of an aircraft with respect to a radio station and to receive signals therefrom comprising a movable device for charting the course of the flight, radio range signaling means, means operated by the device for controlling the signaling means to furnish signals adapted to represent those that would be received at the corresponding point on an actual radio range and means for introducing disturbances to the signaling means to simulate the effects of static.

45. In an aircraft flight simulating apparatus for indicating and controlling one or more flight conditions, a plurality of aircraft controls for the said one or more conditions, electrical means associated with each control for deriving a voltage varying in accordance with adjustment of that control, thermionic valve means responsive to the resultant of said derived voltages and a flight indicating instrument responsive to said thermionic valve means and actuated in accordance with the resultant of all of the voltages.

46. Apparatus according to claim 45 in combination with an attenuator for varying the sensitivity of the response of the flight indicating instrument to simulate different responses of various types and sizes of aircraft to operation of their controls.

47. Apparatus according to claim 45 in combination with electrical means for causing perturbations in the indication of the flight instrument to simulate the behavior of an actual instrument under rough air conditions as encountered in actual flight.

48. In apparatus for simulating the flight of an aircraft, an aircraft control, means associated with the control for deriving a voltage varying in accordance with movement of that control, a flight indicating instrument responsive to the voltage and electrical means comprising the combination of an electrical reactance and an electrical resistance for delaying the response of the instrument to cause the instrument to react to the operation of the control in a manner simulating the reaction of a similar instrument in an actual aircraft.

49. In an aircraft flight simulating apparatus a plurality of aircraft controls, means associated with each control for deriving a control voltage in accordance with movement of the control, a thermionic valve circuit and a flight indicating instrument responsive to the control voltages, power means responsive to the vacuum tube circuit and whereby a flight station is moved by the power means.

50. Apparatus according to claim 49 in combination with means for causing the instrument and the operating station to move in resemblance to rough air conditions encountered in actual flight.

51. In an aircraft flight simulating apparatus for indicating and controlling one or more flight conditions, a plurality of controls for the said one or more conditions, means associated with each control for deriving a voltage varying in accordance with adjustment of that control, an amplifier having input circuit connections to all of the voltage deriving means and an output current having at least one of its parameters varying in accordance with the resultant of all the voltages and a flight indicating instrument responsive to the output current.

52. In a flight simulating apparatus for indicating and controlling one or more flight conditions a plurality of controls for the said one or more conditions, means associated with each control for deriving a voltage varying in accordance with movement of that control, means for producing an output current having at least one of its parameters varying in accordance with the resultant of predetermined percentages of each derived voltage, the current producing means including a thermionic valve amplifier having input connections to all of the voltage deriving means, each connection including an element having a value of resistance adjusted with respect to the value of every other element to yield in the resultant, the correct percentage of its connected derived voltage, and a flight indicating instrument responsive to the output current.

53. In flight simulating apparatus for indicating and controlling one or more flight conditions, a plurality of controls for said one or more conditions, means associated with each control for deriving a voltage varying in accordance with movement of that control, a flight indicating instrument, means for causing the instrument to respond to the resultant of the voltages, a network circuit for delaying the effect on the resultant of the derived voltage from at least one of the controls, and an electrical circuit responsive to two of the controls for varying the delay according to the movement of one of said controls relative to the other.

54. In flight simulating apparatus for indicating and controlling one or more flight conditions, an aircraft control for the said one or more conditions, means associated with the control for deriving a voltage varying in accordance with adjustment of the control, a motor, means for causing the velocity of the motor to be proportional to the derived voltage over the entire operating range of the control and a flight indicating instrument operated by changes in the velocity of the motor.

55. In flight simulating apparatus for indicating and controlling a flight movement a plurality of controls for said movement, means associated with each control for deriving a control voltage varying in accordance with adjustment of the control, means for producing a voltage proportional to the sum of the control voltages, a motor, means for causing the velocity of the motor to be proportional to the sum of the control voltages over the whole operation range of the controls and a device for indicating the time integral of said movement operated by the motor and calibrated in terms of a flight variant.

56. In a flight simulating apparatus for indicating and controlling one or more flight conditions, a plurality of simulated aircraft controls for the said one or more conditions, means associated with each control for deriving a voltage varying in accordance with adjustment of the control, a source of reference alternating potential, means for deriving an alternating current varying in phase with respect to the reference potential and varying in magnitude, both variations being in accordance with changes in the resultant of the derived voltages, power means responsive to the derived alternating current and a flight indicating instrument responsive to the power means.

57. Flight simulating apparatus for indicating and controlling a flight maneuver, a plurality of controls for said maneuver, means associated with each control for deriving a voltage varying in accordance with adjustment of the control, a reference alternating potential, means for deriving an alternating current varying in phase with respect to the reference potential and varying in magnitude, both variations being in accordance with changes in the resultant of the derived voltages, power means operated by the derived alternating current and a course-indicating device operated according to two or more forces, one of which is derived from the power means.

58. Flight simulating apparatus for indicating and controlling one or more flight conditions comprising a plurality of aircraft controls operable by a pupil to simulate the operation of the controls of an actual aircraft in flight, means associated with each control for deriving a voltage varying in accordance with the movement of that control, thermionic valve means responsive to the resultant of said derived voltages, a flight indicating instrument responsive to said thermionic valve means and actuated in accordance with the resultant of the voltages and an electrical circuit operative when the controls are moved to a stall position for modifying the resultant of the voltages to cause the instrument to move in simulation of an actual stall as may occur in an aircraft.

59. Flight simulating apparatus for indicating and controlling a flight maneuver, a plurality of aircraft flight controls operable to simulate the operation of the controls of an actual aircraft being maneuvered on a course, an electrical circuit having a plurality of electrical branch circuits provided with variable electrical means responsive to respectively corresponding of said flight controls for deriving branch circuit voltages in accordance with the position of said controls, two moving elements each responsive to at least one of the derived voltages and course indicating means operated in accordance with the motion of the two moving elements to show the position of the aircraft on its course.

60. Flight-simulating apparatus for indicating and controlling a flight maneuver conducted with respect to a radio station comprising aircraft controls operable by a pupil to simulate the maneuvering of an actual aircraft with respect to a beam projected by said station, a movable element responsive to the operation of the controls and moving in accordance with changes in the simulated altitude of the aircraft above the radio station, a second movable element responsive to the operation of the controls and moving in accordance with the simulated distance of the aircraft from the radio station, a beam indicator and means controlled conjointly by the movable elements for positioning the indicator in accordance with the position of the aircraft with respect to the beam.

61. Flight-simulating apparatus for indicating and controlling a flight maneuver comprising aircraft controls operable by a pupil to simulate the maneuvering of an actual aircraft with respect to received radio signals from a remote objective, a movable element responsive to the operation of the controls and moving in accordance with changes in the simulated altitude of the aircraft with respect to the objective, a second movable element responsive to the operation of the controls and moving in accordance with the simulated distance of the aircraft from the objective, a third movable element responsive to the operation of the controls and moving in accordance with changes in the direction of the aircraft from the objective, an indicator and means controlled conjointly by the movable elements for positioning the indicator in accordance with the position of the aircraft with respect to the objective.

62. Flight simulating apparatus for indicating and controlling a flight maneuver made with respect to a radio transmitter comprising aircraft controls operable by a pupil for simulating the operation of the controls of an actual aircraft being maneuvered with respect to a beam projected by the radio transmitter, a movable element responsive to the operation of the controls and moving in accordance with changes in the direction of the aircraft from the transmitter, a beam indicator, and means controlled by the moving element for positioning the indicator in accordance with the position of the aircraft with respect to the beam.

63. Flight simulating apparatus for indicating and controlling a flight maneuver conducted with respect to a radio transmitting system comprising aircraft controls operable by a pupil to simulate the maneuvering of an actual aircraft with respect to the flight path defined by the intersection of vertical and horizontal beams projected by an actual radio transmitting system, three movable elements responsive to the operation of the controls, the first element moving in accordance with the changes in altitude of the aircraft with respect to the transmitting system, the second element moving in accordance with the distance of the aircraft from the transmitting system, and the third element moving in accordance with changes in direction of the aircraft from the transmitting system, an aircraft position indicator and means controlled by the moving elements for positioning the indicator in a vertical sense in accordance with the position of the first two elements and in a horizontal sense in accordance with the position of the third element.

64. Flight-simulating apparatus for controlling the flight of an aircraft and thereby varying radio signals received by a pupil comprising a plurality of aircraft flight controls operable by the pupil, means associated with each control for deriving a voltage varying in accordance with the movement of that control, electronic means responsive to at least one of the derived voltages, a movable element operated by the electronic means in accordance with the direction of flight, a second moving element responsive to at least one of the derived voltages from the controls, a source of simulated radio range signals, means operated by the two elements for varying the intensity of the signals from the source in accordance with the variations which would have occurred had a flight been made with like operation of the controls over an actual radio range, and a receiver for the varied signals.

65. Apparatus according to claim 64 in combination with a source of marker signals and means operated by the two elements for energizing the receiver from the marker signal source when the two moving elements are in a position corresponding to the location of a marker signal beam on the actual radio range.

66. Apparatus according to claim 64 in which the means operated by the two elements includes a plurality of members angularly adjustable to simulate different radio range field strength patterns.

67. Flight-simulating apparatus for controlling the flight of an aircraft and thereby varying radio signals received by a pilot comprising a plurality of aircraft flight controls operative by the pilot, means associated with each control for deriving a voltage varying in accordance with the movement of that control, two movable elements each responsive to at least one of the derived voltages, a source of simulated radio range signals, means operated by the two elements for varying the intensity of the signals from the source in accordance with the variations which would have occurred had a flight been made with like operation of the controls over an actual radio range comprising a plurality of radio range stations, and means for selectively receiving the signals representing any one of the stations.

68. Flight simulating apparatus for indicating and controlling one or more flight conditions comprising a plurality of controls for the said one or more conditions, an electrical circuit having a plurality of electrical circuit branches each provided with variable electrical means, said variable electrical means being selectively operable by said flight controls for deriving branch circuit voltages whose parameters vary in accordance with the adjustment of said flight controls, a transducer electrically connected to said branch circuits and including thermionic valve means for combining said derived voltages to produce a voltage having a parameter proportional to the resultant of the parameters of said derived voltages, a motor and a first simulated flight indicating instrument responsive to the electrical circuit and a second simulated flight indicating instrument responsive to the motor said instruments conjointly indicating one or more of the said flight conditions.

69. Flight-simulating apparatus for indicating and controlling a flight maneuver with respect to a radio transmitter comprising a plurality of controls for said maneuver, the controls being operable by a pupil to simulate the maneuvering of an actual aircraft with respect to said radio transmitter, two movable elements responsive to operation of the controls and moving in accordance with the simulated changes in position of the aircraft about the radio transmitter and an indicating device operated by at least one of the elements said device being adapted to simulate a radio direction determining instrument of an aircraft.

70. In an aircraft simulating apparatus a plurality of controls simulating the controls of an actual aircraft, means operated by each of the controls for deriving a voltage according to the movement of that control, a record of sounds characteristic of those heard in an aircraft, reproducing means cooperating with the record, a receiver connected to the reproducing means, and means responsive to the derived voltages for varying the pitch and amplitude of the reproduced sounds to simulate the variation in the noise heard in an actual aircraft with corresponding movement of the controls.

71. Aircraft simulating apparatus according to claim 70 in combination with a simulated aircraft engine tachometer responsive to the derived voltages.

72. In aircraft simulating apparatus two controls for simulating respectively a banking and a turning control of an aircraft, means associated with each control for deriving a voltage according to the movement of that control, a movable element adapted to be tilted and moved in azimuth in simulation of the motion of the movable element of a magnetic compass in an actual aircraft, means responsive to the voltage varying in accordance with the movement of the banking control for tilting the element, and means responsive to the voltage varying in accordance with movement of the turning control for moving the element in azimuth.

73. Apparatus according to claim 72 in combination with means responsive to movement of the banking control for modifying the motion of the element in azimuth to simulate "north turning error."

74. In aircraft simulating apparatus elevator, throttle and aileron controls, means associated with each control for deriving a voltage varying in accordance with movement of that control, two movable elements simulating the pitch and bank elements of an artificial horizon instrument of an actual aircraft, means responsive to the voltages varying according to the movement of the elevator and throttle controls for moving the pitch element and means responsive to the voltage varying according to the movement of the aileron control for moving the bank element.

75. In an aircraft simulating apparatus a plurality of controls adapted to be operated by a pupil and simulating the controls of an actual aircraft, means associated with each control for deriving a voltage varying in accordance with movement of that control, a source of signals adapted to simulate actual radio signals and a receiver therefor, means responsive to the derived voltages for varying the signals received from the source and means for introducing noise into the receiver to simulate the effects of static on radio reception in an aircraft.

76. In an aircraft simulating apparatus a plurality of controls simulating the controls of an actual aircraft, means associated with each control for deriving a voltage varying in accordance with movement of that control, a movable pilot's seat, means associated with the seat for deriving a voltage varying in accordance with movement of the seat but having a negative value as compared to the voltage from any of the controls when moving in like sense to the seat, a vacuum tube amplifier having input circuit connections to all of the voltage deriving means and having an output current varying in proportion to the resultant of all of the derived voltages, and a motor for moving the seat, the motor being responsive to the output current.

77. Flight-simulating apparatus for indicating and controlling one or more flight conditions comprising a plurality of controls for the said one or more conditions, variable electrical means responsive to said controls, electronic means responsive to the said variable electrical means for deriving a potential varying with the adjustment of said controls, a motor electrically connected to the said electronic means and operating in speed and direction in accordance with the derived potential and a flight-indicating instrument operated by said motor.

78. Apparatus according to claim 77, in which the flight-indicating instrument comprises a tachometer calibrated in terms of a flight variant.

79. An emplaced flight-simulating apparatus for indicating and controlling one or more flight conditions comprising a plurality of controls for the said one or more conditions, a source of voltage, means connected to the source and operated by the controls for deriving a voltage varying with the adjustment of said controls, a thermionic valve circuit responsive to the derived voltage, electric power means responsive to the said thermionic valve circuit and a flight-indicating instrument operated by the power means.

80. An emplaced flight-simulating apparatus for indicating and controlling a flight condition comprising a plurality of controls for the said condition, a potentiometer operated by each control, a source of potential connected to the potentiometers, a thermionic valve circuit actuated in accordance with the settings of the potentiometers, a motor controlled by the circuit and a flight-indicating instrument driven by the motor to show the variations produced in the said flight condition by adjustment of said controls.

81. Apparatus for simulating the flight of an aircraft comprising aircraft controls, a potentiometer operated by each control, a source of potential connected to the potentiometers, a thermionic valve circuit actuated in accordance with the settings of the potentiometers, a motor controlled by the circuit and an operating station actuated by the motor at a rate and in a direction corresponding to the simulated flight.

82. Apparatus according to claim 77 in which the electronic means has an input circuit energized by the algebraic sum of potentials obtained from potentiometers operated by the flight controls.

83. An emplaced flight simulating apparatus for indicating and controlling one or more flight conditions, comprising controls for the said one or more conditions, a thermionic valve circuit with means for rendering the circuit responsive to the controls, power means controlled by the circuit, a flight-indicating instrument actuated by the power means and electrical means for delaying the response of the circuit to the controls to cause the instrument to react to the operation of the controls in like manner to the operation of a similar instrument in an actual aircraft.

84. Flight-simulating apparatus for indicating and controlling one or more flight conditions, said apparatus comprising aileron and rudder controls, a source of voltage, an electrical circuit connected to said source having a plurality of electrical circuit branches each provided with variable electrical means, said variable electrical means being responsive to said flight controls for deriving branch circuit voltages, thermionic valve means responsive to the resultant of said derived voltages, a galvanometer responsive to the said thermionic valve means, the galvanometer being arranged to indicate one of said flight conditions and means for intermittently applying a voltage to said galvanometer to cause it to deflect in simulation of rough air as may be encountered in actual flight.

85. In a flight-simulating apparatus for indicating and controlling the course of a flight with respect to a source of radio signals, a traversing surface having a north reference direction, a course-indicating device adapted to move with respect to the surface in accordance with said flight course, a pivoted member spacially disposed with respect to the surface at a position such that a projection of the center-line of the pivot intercepts the surface at a point representing the location of the radio signal source, an operative connection between the member and the course-indicating device whereby the member is moved with changes in the bearing of said device relative to the pivot position and an indicating element responsive to the member for showing movement thereof and adapted to simulate a radio direction instrument in an aircraft.

86. Apparatus adapted to simulate the flight of an aircraft with respect to a fan marker radio station, said apparatus comprising a plurality of controls for the flight, a source of voltage, an electrical circuit connected to said source and having a plurality of electrical circuit branches each provided with variable electrical means responsive to said flight controls for deriving branch circuit voltages whose parameters vary in accordance with the adjustment of said flight controls, a transducer electrically connected to said branch circuits and including thermionic valve means for combining said derived voltages to produce a voltage having a parameter proportional to the resultant of the parameters of said derived voltages, motor means responsive to said proportioned parameter, a course indicating device controlled by the motor means, the movement of the device representing the movement of the aircraft with respect to the radio station, a source of fan marker signals, a receiver therefor, a circuit for connecting the source to the receiver and means operated by the course indicating device for closing the circuit when the indicating device is operated in simulation of flight through the radiation of the fan marker radio station.

87. Training apparatus for simulating the flight of an aircraft with respect to a radio station, an electrical circuit having a plurality of electrical circuit branches each provided with variable electrical means, said variable electrical means being under control of a trainee for said flight for deriving branch circuit voltages, thermionic valve means responsive to the resultant of said derived voltages, a flight-position indicating device responsive to the said thermionic valve means for showing the instant position of the aircraft with respect to the radio station, a source of signals adapted to simulate the signals of said radio station, a receiver therefor, means for attenuating the signals, an operative connection between the indicating device and the attenuating means for varying the received signals in accordance with the position of the flight-indicating device, and means for independently adjusting the postion of the attenuator to introduce the effects of wind drift or beam irregularities.

88. In emplaced apparatus for simulating the flight of an aircraft, a plurality of aircraft controls, means associated with each control for deriving a voltage varying in accordance with adjustment of that control, an amplifier having an input circuit responsive to said plurality of the voltage deriving means and having an output current at least one of the parameters of which varies in accordance with the resultant of said plurality of voltages and a course-indicating device having a plurality of actuating means one of which is responsive to the output current of said amplifier.

89. In flight-simulating apparatus for indicating and controlling a flight condition, a plurality of controls for the said condition, means associated with each control for deriving a control voltage varying in accordance with movement of the control, an electronic amplifier having an input circuit responsive to said plurality of the voltage deriving means and having an output current at least one of the parameters of which varies with the resultant of the control voltages, power means and a flight instrument for indicating the instant magnitudes of the condition, both responsive to the output current and an integrating device for indicating the time integral of said instant magnitudes responsive to the power means.

90. Apparatus according to claim 89 in combination with a network circuit causing a delay in the response of the power means and the flight-indicating instrument when one or more of the control voltages is varied.

91. Flight-simulating apparatus for indicating and controlling one or more flight conditions comprising a plurality of controls for the said one or more conditions, a source of voltage, electrical means associated with each control and connected to the source for deriving a voltage having a parameter varying with the adjustment of that control, means for combining the derived voltages to produce a voltage having a parameter proportional to the resultant of the parameters of the derived voltages, electrical driving means operably associated with the combining means and operating in speed and direction in accordance with the resultant parameter, a flight-indicating instrument for indicating one of said conditions and means for operating the instrument in accordance with the movement of said driving means.

92. In flight-simulating apparatus containing electrical means for indicating and controlling a simulated flight condition, comprising an element the position of which corresponds to the magnitude of such condition, a plurality of flight controls for the condition, a source of voltage, means associated with each control and connected to the source for deriving a voltage having a parameter varying with the adjustment of that control, means associated with the element and connected to the source for deriving a voltage having a parameter varying with the position of said element but in an opposite sense to the parameter of at least one of the control-derived voltages, means for combining all of the derived voltages to obtain a voltage having a parameter corresponding to the resultant of the parameters of all the derived voltages, power means for driving the element, said power means being responsive to said resultant parameter to drive the element in such direction as to minimize the parameter.

93. In flight-simulating apparatus containing means for indicating and controlling a simulated flight condition, comprising an element the position of which corresponds to the magnitude of such condition, a plurality of flight controls for the condition, a source of voltage, means associated with each control and connected to the source for deriving a voltage having a parameter varying with the adjustment of that control, means associated with the element and connected to the source for deriving a voltage having a parameter varying with the position of said element but in an opposite sense to the parameter of at least one of the control-derived voltages, means for combining all of the derived voltages to obtain a voltage having a parameter corresponding to the resultant of the parameters of all the derived voltages, means for intermittently varying said resultant of the parameters of said derived voltages in accordance with variations such as might be encountered in flight under rough air conditions, power means for driving the element, said power means being responsive to said resultant parameter to drive the element in such direction as to minimize the parameter.

94. Flight-simulating apparatus for indicating and controlling a flight maneuver comprising a plurality of controls for the said maneuver, a source of voltage, means associated with each control and connected to the source for deriving a voltage having a parameter varying with the adjustment of that control, means for combining the derived voltages to produce a voltage having a parameter proportional to the resultant of the parameters of the derived voltages, power means operated in accordance with said proportional parameter, a device for indicating the course of the said maneuver actuated by a plurality of forces one of which is derived from said power means.

95. Apparatus adapted to simulate the flight of an aircraft with respect to a radio station, said apparatus comprising a plurality of controls for the flight, a source of voltage, means associated with each control and connected to the source for deriving a voltage having a parameter varying with the adjustment of that control, means for combining the derived voltages to produce a voltage having a parameter proportional to the resultant of the parameters of the derived voltages, a motor responsive to the deriving means and operating in speed and direction in accordance with the resultant parameter, a device for indicating the course of the maneuver operated by a plurality of forces one of which is derived from said motor, a member pivoted independently of the indicating device at a point representing the location of the radio station, an operative connection between said member and the charting device for moving the member in accordance with changes in relative direction of the device from the member, an element adapted to simulate the direction indicating element of the radio direction apparatus of an aircraft and means responsive to movement of said member for moving the direction indicating element to show the bearing of the aircraft relative to the station.

96. Emplaced electrically-responsive, flight-simulating apparatus for indicating and controlling a flight maneuver, said apparatus comprising a plurality of controls for varying the speed of the aircraft in the maneuver, a source of voltage, an electrical transducer associated with each speed control and connected to the source for deriving a voltage having a parameter varying with the adjustment of that speed control, a circuit for combining the derived speed voltages to produce a voltage having a parameter proportional to the resultant of the parameters of the derived speed-voltages, a motor responsive to the speed-voltage combining means and operating at a velocity proportional to the resultant parameter of the combined speed-voltages, a device for indicating the course of the maneuver, said device being actuated along the course by said motor and directed in azimuth by a power means, a plurality of controls for varying the direction of the maneuver, means associated with each of said direction controls and connected to the source for deriving a voltage having a parameter varying with the adjustment of that direction control, means for combining the derived direction voltages to produce a voltage having a parameter proportional to the resultant of the parameters of all the derived direction voltages, and means whereby the azimuth directing power means associated with said course indicating device is rendered responsive to the resultant of the combined direction voltages.

97. Electrically-powered, aircraft flight-simulating apparatus for indicating and controlling a flight condition comprising a plurality of controls for the condition, a source of voltage, an electrical device associated with each control and connected to the source for deriving a voltage having a parameter varying with the adjustment of that control, a servo-motor, electrical means associated therewith and connected to the source for deriving a voltage having a parameter varying in a negative sense to the parameter of at least one of the derived voltages, an electrical circuit for combining all the derived voltages to produce a voltage having a parameter proportional to the resultant of the parameters of all the said derived voltages and means for operating said servo-motor in accordance with said resultant proportional parameter to move an element to a position representing said flight condition.

98. Apparatus according to claim 97 in which the element moved by the servo-motor is a compartment adapted to simulate a part or all of an aircraft fuselage.

99. Apparatus for simulating the flight of an aircraft comprising a plurality of flight controls, a source of voltage, an electrical circuit connected to said source and having a plurality of electrical circuit branches each provided with variable electrical means, said variable electrical means being selectively operable by said flight controls for deriving branch circuit voltages whose parameters vary in accordance with the adjustment of said flight controls, a transducer electrically connected to said branch circuits and including thermionic valve means for combining the derived voltages to produce a voltage having a parameter proportional to the resultant of the parameters of said derived voltages, power means actuated in accordance with said proportional parameter, an operating station adapted to represent a part or all of an aircraft and means for moving the station in accordance with the movement of the power means.

100. Flight-simulating apparatus for indicating and controlling one or more flight conditions comprising a plurality of controls for the said one or more conditions, a source of voltage, an electrical circuit connected to said source and having a plurality of electrical circuit branches each provided with variable electrical means, said variable electrical means being selectively operable by said flight controls for deriving branch circuit voltages whose parameters vary in accordance with the adjustment of said flight controls, a transducer electrically connected to said branch circuits and including thermionic valve means for combining the selected voltages to produce a voltage having a parameter proportional to the resultant of the parameters of the selected voltages, power means operating in speed and direction in accordance with the resultant parameter, a flight-indicating instrument for indicating one of said conditions, means for operating the instrument in accordance with the rotation of the power means and electrical means for intermittently deflecting the indicator to simulate behavior in rough air.

101. Aircraft flight-simulating apparatus for representing and controlling one or more flight conditions comprising a plurality of controls for the said one or more conditions, a source of voltage, an electrical device associated with each control and connected to the source for deriving a voltage having a parameter proportional to the adjustment of that control, electrical means for combining all the derived voltages to produce a resultant voltage having a parameter proportional to the resultant of the parameters of all the said derived voltages, a source of noise signals adapted to simulate the sound of an aircraft in flight, a receiver for said signals and means responsive to the resultant proportional parameter for varying the pitch and intensity of the signals.

102. Apparatus according to claim 101 in which the source of the noise signals comprises a rotating element adapted to produce a modulated potential in an electric circuit associated with said receiver and in which the means for varying the pitch and intensity of the signals is a motor arranged to drive the rotating element at a speed proportional to said resultant parameter.

103. In flight simulating apparatus for indicating and controlling a flight condition, a plurality of controls for said flight condition, means associated with each control for deriving a voltage varying in accordance with adjustment of such control, a source of reference alternating potential, means for deriving an alternating current varying in phase with respect to the reference potential and varying in magnitude, both variations being in accordance with changes in the resultant of the derived voltages, a motor responsive to the derived alternating current, a flight instrument for indicating the instant magnitudes of the condition, and an integrating device responsive to the motor for indicating the time integral of said instant magnitudes.

104. Training apparatus comprising a plurality of aircraft controls for controlling one or more flight conditions, a plurality of variable electrical means selectively responsive to said controls for deriving potentials each having a parameter varying with the operation of one or more of said controls, a plurality of transducers each including thermionic valve means and responsive to a plurality of said derived potentials for obtaining an output voltage having a parameter varying in accordance with the resultant of the parameters of the derived voltages connected to respective of said transducers, and a plurality of electrical means responsive to the parameters of respective of said transducer output voltages and calibrated in terms of respective of said flight conditions for indicating the instant value of said flight conditions.

105. A training apparatus comprising a plurality of flight controls, a plurality of electrically controlled flight condition indicators, a plurality of transducers operatively connected to respective of said indicators, each transducer having a plurality of variable electrical means connected thereto and operable by a plurality of said controls for deriving a plurality of input voltages to said transducer, each said input voltage having a parameter varying with the manipulation of respectively associated of said controls, and each of said transducers comprising thermionic valve means for deriving an output voltage having a parameter varying in accordance with the resultant of the parameters of its respective input voltages, whereby conjoint manipulation of related flight controls indicates the resultant flight condition or conditions by means of said indicators.

106. Training apparatus comprising a plurality of aircraft controls for one or more flight conditions, a plurality of electrically controlled indicators for depicting said flight conditions, a plurality of transducers corresponding respectively to said indicators and operatively associated therewith, a plurality of electrical networks each comprising a plurality of variable electrical means operable in accordance with manipulation of a plurality of said aircraft controls to thereby derive potentials whose parameters vary with said manipulation, said plurality of networks being connected respectively to said plurality of transducers whereby said derived potentials of said networks provide input voltages for respectively corresponding of said transducers, each of said transducers including thermionic valve means for deriving an output voltage having a parameter varying in accordance with the resultant of the parameters of its respective input voltages, and said indicators being responsive to the parameters of respective of said output voltages, whereby each of said indicators may be actuated in accordance with the predetermined conjoint manipulation of a plurality of said controls.

107. A training apparatus comprising a plurality of flight controls, a plurality of electrically controlled flight condition indicators, a plurality of transducers operatively connected to respective of said indicators, each transducer having a plurality of variable electrical means connected thereto and operable by a plurality of said controls for deriving a plurality of input voltages to said transducer, each said input voltage having a parameter varying with the manipulation of respectively associated of said controls, each of said transducers comprising thermionic valve means for deriving an output voltage having a parameter varying in accordance with the resultant of the parameters of its respective input voltages, a servo-motor operable by the output voltage of one of said transducers, and variable electrical means operatively connected to said servo-motor for deriving a modifying potential having a parameter varying in accordance with the operation of said servo-motor, said modifying potential being connected to the input side of one of said transducers to thereby modify the output voltage thereof, whereby conjoint manipulation of related flight controls indicates the resultant flight condition or conditions by means of said indicators.

108. Training apparatus comprising a plurality of aircraft controls for controlling one or more flight conditions, a plurality of variable electrical means selectively responsive to said controls for deriving potentials each having a parameter varying with the operation of one or more of said controls, a plurality of transducers each including thermionic valve means and responsive to a plurality of said derived potentials for obtaining an output voltage having a parameter varying in accordance with the resultant of the parameters of the derived voltages connected to respective of said transducers, an element whose position corresponds to the magnitude of at least one of said flight conditions, variable electrical means associated with said element for deriving a potential having a parameter varying with the position of said element but in an opposite sense to the parameter of at least one of said control-derived potentials, said variable electrical means being electrically connected to one of said transducers, power means for driving said element, said power means being responsive to the resultant parameter of said transducer to which said variable electrical means is connected to drive said element in a direction to minimize the said resultant parameter, and a plurality of electrical means responsive to the parameters of respective of said transducer output voltages and calibrated in terms of respective of said flight conditions for indicating the instant value of said flight conditions.

109. Electrically powered flight-simulating apparatus for indicating and controlling one or more flight conditions, comprising flight controls for the said one or more conditions, a thermionic valve circuit responsive to the controls, a motor responsive to said thermionic valve circuit, a flight indicating instrument responsive to the motor, electrical means for intermittently causing the motor to deflect the indicator to simulate behaviour in rough air, said flight controls being adjustable to restore said deflections to normal, said electrical means comprising a second motor, means for varying the speed of said second motor, a plurality of cams each driven by said second motor at a different speed, a plurality of contacts operated by said cams, a voltage source and series connections between the source, the contacts and the thermionic valve circuit.

RICHARD CARL DEHMEL.

CERTIFICATE OF CORRECTION.

Patent No. 2,366,603. January 2, 1945.

RICHARD CARL DEHMEL.

It is hereby certified that error appears in the printed specification of the above numbered patent requiring correction as follows: Page 1, second column, line 49, for "control" read --controls--; page 3, second column, line 26, for "60" read --60'--; page 4, second column, line 27, for "defleced" read --deflected--; page 5, first column, line 44, for "respetcively" read --respectively--; page 7, first column, line 10, for "instrument" read --instruments--; page 10, first column, line 30, for "contact" read --contacts--; line 37, for "Figs. 9" read --Fig. 9--; and second column, line 2, before "visually" insert --a--; page 11, first column, line 10, for "a before" read --as before--; page 12, first column, line 21-22, for "automaticalley" read --automatically--; page 17, second column, line 23, claim 3, after "means," insert --and--; line 36, claim 5, for the claim reference numeral "34" read --83--; page 18, second column, line 15, claim 18, for the claim reference numeral "86" read --85--; page 19, first column, line 72, claim 24, after the words "of the" insert --said--; page 19, second column, line 44, claim 27, after "signal" insert --controller--; page 20, first column, line 6, claim 29, for "responsive to" read --responsive to the--; page 21, first column, line 27, claim 42, for the claim reference numeral "86" read --85--; and second column, line 37, claim 49, after "circuit" strike out "and"; and that the said Letters Patent should be read with this correction therein that the same may conform to the record of the case in the Patent Office.

Signed and sealed this 10th day of April, A. D. 1945.

(Seal)

Leslie Frazer
Acting Commissioner of Patents.